US012786963B2

(12) United States Patent
Deng et al.

(10) Patent No.: US 12,786,963 B2
(45) Date of Patent: Nov. 3, 2026

(54) METHODS AND SYSTEMS FOR COVERAGE ENHANCEMENT IN WIRELESS NETWORKS

(71) Applicant: ZTE Corporation, Shenzhen (CN)

(72) Inventors: Yiwei Deng, Shenzhen (CN); Xianghui Han, Shenzhen (CN); Peng Hao, Shenzhen (CN); Jian Li, Shenzhen (CN)

(73) Assignee: ZTE Corporation, Shenzhen (CN)

(*) Notice: Subject to any disclaimer, the term of this patent is extended or adjusted under 35 U.S.C. 154(b) by 699 days.

(21) Appl. No.: 18/306,036

(22) Filed: Apr. 24, 2023

(65) Prior Publication Data

US 2023/0345432 A1 Oct. 26, 2023

Related U.S. Application Data

(63) Continuation of application No. PCT/CN2021/072266, filed on Jan. 15, 2021.

(51) Int. Cl.

| | |
|---|---|
| ***H04W 72/04*** | (2023.01) |
| ***H04L 1/08*** | (2006.01) |
| ***H04W 72/0446*** | (2023.01) |
| ***H04W 72/21*** | (2023.01) |

(52) U.S. Cl.

CPC ........... *H04W 72/0446* (2013.01); *H04L 1/08* (2013.01); *H04W 72/21* (2023.01)

(58) Field of Classification Search

CPC ..... H04W 48/14; H04W 72/04; H04W 16/14; H04W 48/16; H04W 48/12; H04L 5/001; H04L 5/0053; H04L 5/0092

See application file for complete search history.

(56) References Cited

U.S. PATENT DOCUMENTS

| | | | | |
|---|---|---|---|---|
| 11,778,617 | B2 * | 10/2023 | Yang | H04W 72/1268 370/329 |
| 12,041,648 | B2 * | 7/2024 | Lee | H04L 5/1469 |
| 2020/0107375 | A1 | 4/2020 | Lee et al. | |
| 2021/0195654 | A1 * | 6/2021 | Lei | H04W 74/0833 |
| 2022/0006575 | A1 * | 1/2022 | Cozzo | H04L 1/0073 |
| 2022/0029737 | A1 | 1/2022 | Park et al. | |

(Continued)

FOREIGN PATENT DOCUMENTS

| | | | | |
|---|---|---|---|---|
| CA | 3090242 | A1 * | 2/2021 | H04W 72/53 |
| CN | 101778475 | | 7/2010 | |

(Continued)

OTHER PUBLICATIONS

Nokia, et al. "Discussion on approaches and solutions for NR PUSCH coverage enhancement" 3GPP TSG RAN WG1 #103, e-Meeting, Oct. 26-Nov. 13, 2020, R1-2009792, 16 pages (Year: 2020).*

(Continued)

*Primary Examiner* — Lan-Huong Truong

(74) *Attorney, Agent, or Firm* — Ashurst Perkins; Coie US LLP

(57) ABSTRACT

Apparatuses, methods, systems, and computer readable media are disclosed. In one aspect, a wireless communication method is disclosed. The method includes configuring, by a network node, a multi-slot transmission by determining a number of repetition transmissions based on available slots according to a rule for performing repetition transmissions in consecutive slots, and transmitting a message according to the repetition transmissions.

12 Claims, 21 Drawing Sheets

(56) References Cited

U.S. PATENT DOCUMENTS

| | | | | |
|---|---|---|---|---|
| 2022/0210806 | A1* | 6/2022 | Rastegardoost | H04L 5/0094 |
| 2024/0106611 | A1* | 3/2024 | Wang | H04L 5/0053 |

FOREIGN PATENT DOCUMENTS

| | | |
|---|---|---|
| CN | 109392107 | 2/2019 |
| CN | 111901870 | 11/2020 |

OTHER PUBLICATIONS

International Search Report and Written Opinion for PCT/CN2021/072266, filed Jan. 15, 2021, Report dated Sep. 28, 2021, 12 pages.
Extended European Search Report for co-pending EP Appl. No. 21918598.0, Report dated Oct. 11, 2023, 15 pages.
Partial Search Report for co-pending EP Appl. No. 21918598.0, Report dated Jul. 10, 2023, 18 pages.
Nokia, et al. "Discussion on approaches and solutions for NR PUSCH coverage enhancement" 3GPP TSG RAN WG1 #103, e-Meeting, Oct. 26-Nov. 13, 2020, R1-2009792, 16 pages.

* cited by examiner

METHODS AND SYSTEMS FOR COVERAGE ENHANCEMENT IN WIRELESS NETWORKS

CROSS-REFERENCE TO RELATED APPLICATION

This application is a continuation and claims priority to International Application No. PCT/CN2021/072266, filed on Jan. 15, 2021, the disclosure of which is hereby incorporated by reference herein in its entirety.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

In one aspect, a method of data communication is disclosed. The method includes configuring, by a network node, a multi-slot transmission by determining a number of repetition transmissions based on available slots according to a rule for performing repetition transmissions in consecutive slots, and transmitting a message according to the repetition transmissions.

In another aspect, a method of data communication is disclosed. The method includes configuring, by a network node, a multi-slot transmission by determining a transmission power of a transmission or repetition transmission according to a rule for performing the repetition transmission in consecutive slots, and performing the transmission or repetition transmission.

In another aspect, a method of data communication is disclosed. The method includes determining, by a user device, availability of a transmission or repetition transmission to perform a transmission in multiple slots, determining, by the user device, availability of a transport block processing over the multiple slots, upon determining that the transmission or repetition transmission and the transport block processing over the multiple slots are available, performing a first determination as to a number of transmission or repetition transmissions and a number of the multiple slots, and performing the transmission based on the first determination.

In another aspect, a method of data communication is disclosed. The method includes determining, by a user device, availability of a transmission or repetition transmission to perform a transmission in multiple slots, determining, by the user device, availability of a transport block processing over the multiple slots, upon determining that the transmission or repetition transmission and the transport block processing over the multiple slots are available, calculating a transport block size based on a single slot or multiple slots, and performing the transmission or repetition transmission based on the transport block size.

In another aspect, a method of data communication is disclosed. The method includes determining, by a user device, availability of a transmission or repetition transmission for transmitting a physical uplink shared channel (PUSCH) in a plurality of uplink slots, determining, by the user device, availability of a transport block processing over the plurality of uplink slots, upon determining that the transmission or repetition transmission and the transport block processing over the plurality of uplink slots are available, multiplexing uplink control information (UCI) on the plurality of uplink slots associated with the transport block processing, and transmitting the uplink control information (UCI) and the PUSCH to a network node.

In another aspect, a method of data communication is disclosed. The method includes determining, by a user device, availability of a repetition transmission for transmitting a transmission of Msg 3 to a network node, configuring a first time domain resource allocation (TDRA) table that is different from existing TDRA tables, determining that the first TDRA table includes the repetition factor, performing the repetition transmission using the first TDRA table for time domain resource allocation, and upon determining that no TDRA tables are configured, using a default table for time domain resource allocation.

In another aspect, a method of data communication is disclosed. The method includes determining availability of a repetition transmission for Msg 3 transmission, determining availability of a frequency hopping, and upon determining that the repetition transmission for Msg 3 transmission and the frequency hopping are available, performing an indication to perform a frequency hopping between slots.

In another aspect, a method of data communication is disclosed. The method includes determining availability of Msg 3 repetition transmission, and upon determining that the Msg 3 repetition transmission is available, performing an indication of a redundancy version (RV) pattern, a cross-slot channel estimation, and an enablement of an enhanced PUSCH repetition type A.

In another aspect, a method of data communication is disclosed. The method includes determining an inter-slot frequency hopping (FH) pattern and inter-slot FH bundling based on time-division duplexing (TDD) configuration and a definition of one FH bundle, and performing a repetition transmission using the inter-slot FH pattern.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

DETAILED DESCRIPTION

Figure 1:
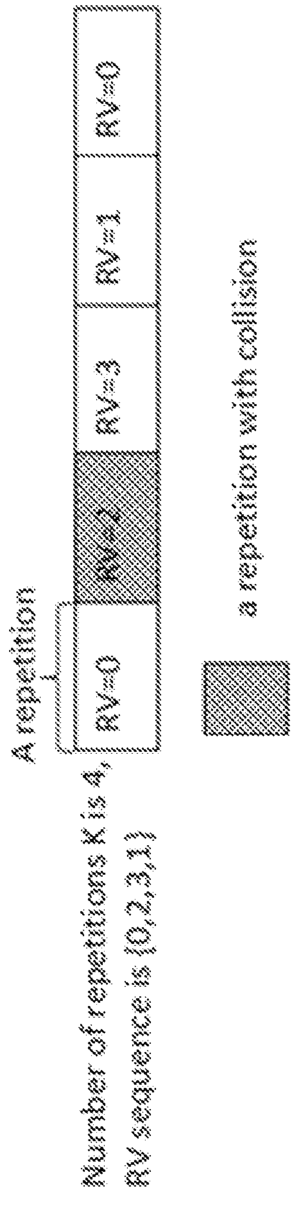
FIG. 1 shows an example of redundancy version (RV) sequence for physical uplink share channel (PUSCH) repetitions transmission.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The current standard provides a new WID on NR (new radio) coverage enhancement, but there are still some coverage bottlenecks. For example, Msg3 and PUSCH (physical uplink shared channel) in a connected state are potential coverage bottleneck channels. The disclosed technology can be used in some embodiments to solve the problem of the coverage bottleneck channels. In particular, some embodiments of the disclosed technology provide enhancement mechanisms for both Msg3 PUSCH and PUSCH in a connected state.

Coverage is one of the key factors that an operator considers when commercializing cellular communication networks due to its direct impact on service quality as well as CAPEX and OPEX. Despite the importance of coverage on the success of NR commercialization, a thorough coverage evaluation and a comparison with legacy RATs considering all NR specification details have not been done up to now.

Among physical channels, Msg3 PUSCH and PUSCH are potential coverage bottleneck channels and corresponding enhancements are needed. For PUSCH transmission, the number of PUSCH type A repetitions determined based on available UL slots and TB (transport block) processing over multiple slots are proposed as ways for coverage enhancement. Then, the methods to distinguish whether the number of repetitions is based on available UL slots or not, and the methods for transmission power calculation, TBS calculation, number of slots indication, UCI (uplink control information) multiplexing on PUSCH for TB processing over multiple slots should be determined.

For Msg3 PUSCH, one straightforward way is to apply repetition transmission for Msg3 PUSCH. Then, it needs solutions to indicate the number of repetitions to user equipment (UE). In addition, other features, such as inter-slot frequency hopping (FH), RV (Redundancy Version) cycling among repetitions, cross-slot channel estimation, contention resolution timer per repetition etc., may be supported on top of Msg3 PUSCH repetition, and corresponding signaling indication is required.

This patent document uses examples from the 3GPP New Radio (NR) network architecture and 5G protocol only to facilitate understanding and the disclosed techniques and embodiments may be practiced in other wireless systems that use different communication protocols than the 3GPP protocols.

In this patent document, the terms "repetition transmission" and "transmission repetition" can be used to indicate repeated transmissions of information via at least one of physical uplink shared channel (PUSCH) transmission repetitions, physical data shared channel (PDSCH), physical uplink control channel (PUCCH), or any other channels.

In the context of this patent document, an indefinite article "a" or "an" carries the meaning of "one or more."

Example Embodiment 1

In Rel-17, the PUSCH repetition type A needs to be enhanced. One of the mechanisms for PUSCH repetition type A enhancement that is the number of repetitions is determined or the counting of the number of repetitions is performed based on available UL slots. However, in Rel-15, the UE repeats the TB across the K consecutive slots applying the same symbol allocation in each slot when the number of repetitions K>1 and a PUSCH transmission in a slot is omitted when any symbols in a repetition is collided (or in conflict) with a frame structure/another transmission. The disclosed technology can be implemented in some embodiments to provide a way to distinguish two of the methods as will be discussed below:

Option1: Using an RRC Signaling to Indicate Whether the Number of Repetitions is Determined Based on Available UL Slots or not If the signaling is configured, e.g., configured as "enable", it means the number of repetitions is determined based on available UL slots. Otherwise, the mechanism in Rel-15 is used.

Option2: Using 1 Bit in DCI (Downlink Control Information) to Indicate Whether the Number of Repetitions is Determined Based on Available Slots or not For instance, if there is an indication "1," the number of repetitions is determined based on available UL slot. In other word, for example, the mechanism in Rel-17 may be used to determine (or count) the number of repetitions. Otherwise, the mechanism in Rel-15 is used.

Option3: Using Some Implicit Methods to Indicate Whether the Number of Repetitions Determined Based on the Available UL Slot or not For instance, it can be linked to the mechanism of the initial access channel enhancement. In some embodiments, if the repetitions for initial Msg3 transmission is enabled or more than one repetition is indicated for Msg3 transmission, then the number of repetitions for PUSCH transmission is determined based on available UL slots. In some embodiments, the number of repetitions for PUSCH transmission is determined based on available UL slots which is determined by the PRACH (physical random access channel) format. In one example, all of the PRACH preambles are grouped into several sets, and the number of repetitions for PUSCH transmission is determined based on available UL slots when using some dedicated preamble sets.

In some embodiments, when the number of repetitions for PUSCH type A is determined based on the available UL slots, the number of repetitions indicated is the number of actual repetitions. In other words, if a repetition is dropped or omitted due to collision, it is not determined in the total number of repetitions.

In some embodiments, when the number of repetitions for PUSCH type A is not determined based on the available UL slots, the number of repetitions indicated is the number of actual repetitions. It means if a repetition is dropped or omitted due to collision, it is not determined in the total number of repetitions.

When the number of repetitions for PUSCH type A is determined based on the available UL slots, the RV for each actual repetition should be determined. The disclosed technology can be used to implement the following methods.

Method 1: RV Cycling is Based on the Actual Repetitions

The corresponding RV index for ith repetition is equal to the (mod(i−1, M)+1)th value in RV sequence, where M is equal to the length of RV sequence.

Method2: RV Cycling is Based on the Nominal Repetitions

Figure 2:
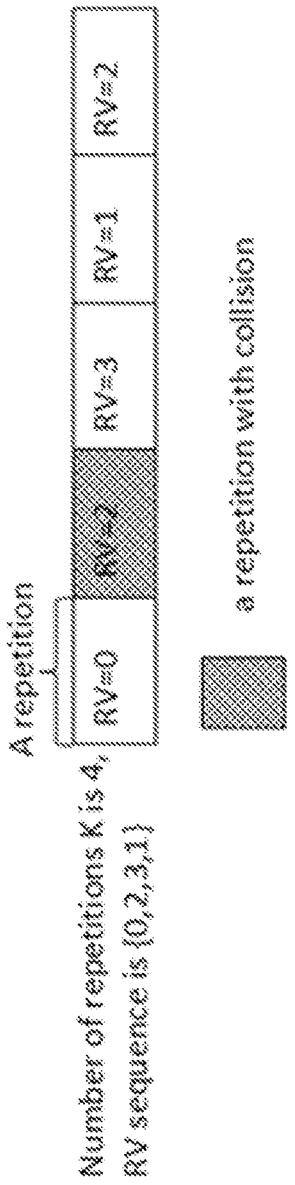
FIG. 2 shows another example of RV sequence for PUSCH repetitions transmission.

FIG. 1 shows an example of redundancy version (RV) sequence for physical uplink share channel (PUSCH) repetitions transmission. FIG. 2 shows another example of RV sequence for PUSCH repetitions transmission.

The RV index is determined when a PUSCH repetition is collided with SFI (Slot Format Indicator) or other transmissions. The nominal number of repetitions K' is equal to actual number of repetitions K adding the number of dropped repetitions. The corresponding RV for ith repetition is equal to the (mod(i−1, M)+1)th value in RV sequence, where M is equal to the length of RV sequence. For instance, as shown in FIG. 1, the number of repetitions transmission K is equal to 4, the RV sequence is {0,2,3,1}. When the second "nominal" repetition is collided or in conflict with SFI, the RV cycling is {0,3,1,0} for the actual repetitions.

Furthermore, postponing the RV of dropped repetitions to the last repetition transmission in sequence. For instance, as shown in FIG. 2, the number of repetitions transmission K is equal to 4, the RV sequence is {0,2,3,1}. When the second "nominal" repetition is collided with SFI, the RV cycling is {0,3,1,2} for the actual repetitions.

Example Embodiment 2

In Rel-15/16, channel estimation was based on a single transmission occasion and a UE determines the PUSCH transmission power $P_{PUSCH,b,f,c}(i,j,q_d,l)$ in PUSCH transmission occasion i when a UE transmits a PUSCH on active UL BWP b of carrier f of serving cell c using parameter set configuration with index j and PUSCH power control adjustment state with index l by the following formula.

$$P_{PUSCH,b,f,c}(i, j, q_d, l) = \min\left\{\begin{matrix} P_{CMAX,f,c}(i), \\ P_{O\_PUSCH,b,f,c}(j) + 10\log_{10}\left(2^{\mu}\cdot M_{RB,b,f,c}^{PUSCH}(i)\right) + \\ \alpha_{b,f,c}(j)\cdot PL_{b,f,c}(q_d) + \Delta_{TF,b,f,c}(i) + f_{b,f,c}(i, l) \end{matrix}\right\}$$

where:

$P_{CMAX,f,c}(i)$ is the UE configured maximum output power for carrier f of serving cell c in PUSCH transmission occasion i.

$P_{O\_PUSCH,b,f,c}(j)$ is a parameter composed of the sum of a component $P_{O\_NOMINAL\_PUSCH,f,c}(j)$ and a component $P_{O\_UE\_PUSCH,b,f,c}(j)$ where $j\in\{0, 1, \ldots, J-1\}$.

$$M_{RB,b,f,c}^{PUSCH}(i)$$

is the bandwidth of the PUSCH resource assignment expressed in number of resource blocks for PUSCH transmission occasion i on active UL BWP b of carrier f of serving cell c and μ is a SCS configuration defined in [4, TS 38.211].

$$\Delta_{TF,b,f,c}(i) = 10\log_{10}\left(\left(2^{BPRE\cdot K_s} - 1\right)\cdot \beta_{offset}^{PUSCH}\right)$$

for $K_S=1.25$ and $\Delta_{TF,b,f,c}(i)=0$ for $K_S=0$ where $K_S$ is provided by deltaMCS for each UL BWP b of each carrier f and serving cell c. If the PUSCH transmission is over more than one layer [6, TS 38.214], $\Delta_{TF,b,f,c}(i)=0$. BPRE and $$\beta_{offset}^{PUSCH},$$

for active UL BWP b of each carrier f and each serving cell c, are computed as below:

$$BPRE = \sum_{r=0}^{C-1} K_r / N_{RE}$$

for PUSCH with UL-SCH data and $$BPRE = Q_m \cdot R / \beta_{offset}^{PUSCH}$$

for CSI transmission in a PUSCH without UL-SCH data, where

C is a number of transmitted code blocks, $K_r$ is a size for code block r, and $N_{RE}$ is a number of resource elements determined as $$N_{RE} = M_{RB,b,f,c}^{PUSCH}(i) \cdot \sum_{j=0}^{N_{symb,b,f,c}^{PUSCH}(i)-1} N_{sc,data}^{RB}(i, j),$$

where $$N_{symb,b,f,c}^{PUSCH}(i)$$

is a number of symbols for PUSCH transmission occasion i on active UL BWP b of carrier f of serving cell $$c, N_{sc,data}^{RB}(i, j)$$

is a number of subcarriers excluding DM-RS subcarriers and phase-tracking RS samples [4, TS 38.211] in PUSCH symbol and assuming no segmentation for a nominal repetition in case the PUSCH transmission is with repetition Type B, $$0 \le j < N_{symb,b,f,c}^{PUSCH}(i),$$

and C, $K_r$ are defined in [5, TS 38.212].

$$\beta_{offset}^{PUSCH} = 1$$

when the PUSCH includes UL-SCH data and $$\beta_{offset}^{PUSCH} = \beta_{offset}^{CSI,1},$$

as described in Clause 9.3, when the PUSCH includes CSI and does not include UL-SCH data $Q_m$ is the modulation order and R is the target code rate, as described in [6, TS 38.214], provided by the DCI format scheduling the PUSCH transmission that includes CSI and does not include UL-SCH data.

For PUSCH repetitions, a cross-slot channel estimation may be used to improve the channel estimation accuracy at receiver side. However, it needs to keep the transmission power for each repetition unchanged. To achieve this, the following ways may be considered.

Option1: transmission power is calculated based on a single TO (transmission occasion) or slot. Furthermore, when optimization of DMRS location/granularity in time domain is adopt, a single TO or slot is the one which has the maximum/minimum available REs within multiple TOs or slots, where, the multiple TOs or slots which are used for jointing channel estimation for gNB. In one example, when gNB performs the channel estimation within N TOs or slots, transmission power is calculated based on the TOs or the slots which have the maximum available REs, REs=max{REto1, REto2, . . . , REtoi}, where, REtoi is equal to the number of available REs within the ith TO or slot. Furthermore, a single TO or slot is the first or any one within the multiple TOs or slots.

Option2: transmission power is calculated based on all the TOs or slots when gNB cross multiple TOs or slots for channel estimation. The number of available REs is equal to: REto1+REto2+ . . . +REtoi, where, REtoi is equal to the number of available REs within the ith TO or slot.

Furthermore, when TB processing over multiple slots is enabled, the similar ways may be reused for transmission power calculation.

Method 1: transmission power is calculated based on a single slot when the transport block size (TBS) is determined based on a single slot. Furthermore, a single slot is one that has the maximum/minimum available REs within multiple slots for TB processing. Furthermore, a single slot is the first or any slot within the multiple slots.

Method 2: transmission power is calculated based on whole slots when the transport block size (TBS) is determined based on multiple slots.

Example Embodiment 3

TB processing over multiple slots has been supported in Rel-17 coverage enhancement work item. The number of slots which the TB crossed needs to be determined. In addition, if repetition is also supported together with TB processing over multiple slots, it needs to further determine the number of slots for TB processing and the number of repetitions. In some embodiments, the number of slots can be consecutive slots. In some embodiments, the number of slots can be inconsecutive slots. In some embodiments, the number of slots can be consecutive available slots. In some embodiments, the number of slots can be inconsecutive available slots.

Figure 3A:
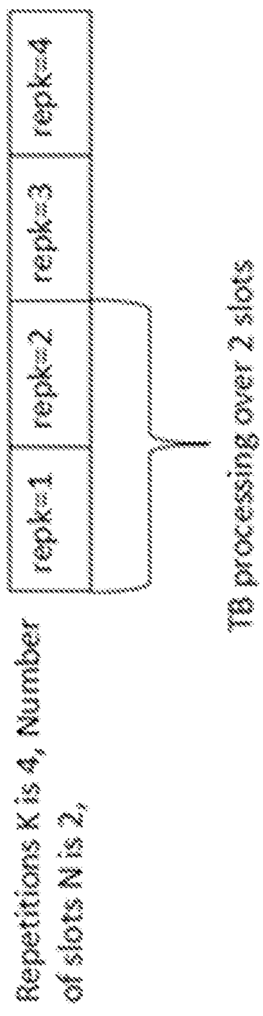
FIG. 3A shows an example of a single slot repetition for TB processing.

FIG. 3A shows an example of a single slot repetition for TB processing.

In some embodiments, the repetition is a single-slot PUSCH repetition. The repetition is a single slot repetition, which means a slot within each PUSCH repetition transmission. For instance, when the number of repetitions is configured to 4 and the number of slots for TB processing is 2. Then each repetition transmission includes a slot in time domain and the total number of slots for PUSCH repetition transmission is 4 (no omit repetition transmission is assumed), and a TB processing over 2-slot, as shown in FIG. 3A.

In some embodiments, the repetition is a repetition of TB processing over multiple slots. For instance, there are a total of four slots, where TB processing is over the first two slots, and it is repeated in the last two slots. The disclosed technology can be used to implement the following methods.

Figure 3B:
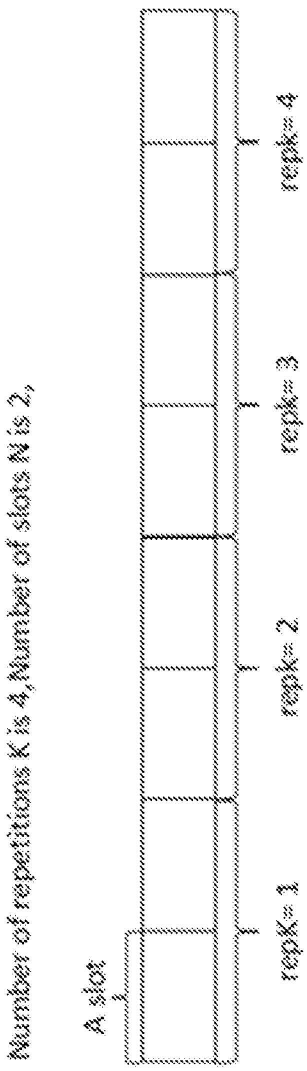
FIG. 3B shows an example of a multi-slot repetition for TB processing.

FIG. 3B shows an example of a multi-slot repetition for TB processing.

In some embodiments, the repetition is a multi-slot repetition for TB processing over multiple slots, which means multiple slots within each PUSCH repetition transmission and the same symbol is allocated in each slot. For instance, when the number of repetitions is configured to 4 and the number of slots for TB processing is 2. Then each repetition transmission includes 2 slots in time domain and the total number of slots for PUSCH transmission is 4*2=8 (no omit repetition transmission is assumed), as shown in FIG. 3B.

Option1: Reusing the current mechanism for indicating the number of repetitions if repetition is enabled, and indicating the number of slots for TB processing separately.

Option 1-1: Using an RRC signaling to indicate a set of values of the number of slots and reusing some bits fields in DCI to indicate the number of slots, e.g., FDRA (Frequency Domain Resource Allocation) field.

Option 1-2: Joint coding with the TDRA table. Add a column in TDRA table to indicate the number of slots. Furthermore, joint coding of the number of slots for TB processing and the number of repetitions K (if repetition is enabled), and configure a table, with each codepoint presenting a number of slots for TB processing and a number of repetitions (furthermore, the number of slots is not larger than the number of repetitions). For instance, the number of repetitions is equal to 4 and the number of slots is equal 2 when the value of codepoint is indicated "0", as shown in Table 1.

TABLE 1 joint coding for number of slots and repetitions

| Codepoint | Number of repetitions | Number of slots |
|---|---|---|
| 0 | 4 | 2 |
| 1 | 8 | 4 |
| . . . | . . . | . . . |
| N | 16 | 4 |

In some embodiments, if the TB processing over multiple slots is enabled and the repetition is a repetition of TB processing over multiple slots. The procedure needs to determine when part of repetition transmission (several symbols or slots) is collided with SFI or other transmissions. Method 1: only the part of slots within a repetition which is collided with SFI or other transmission is omitted, the remaining part of slots within a repetition is transmit. Method 2: the whole repetition transmission is omitted.

Similarly, the repetition and RV pattern should be determined when repetition is also supported together with TB processing over multiple slots. The disclosed technology can be used to implement the following methods.

Figure 4A:
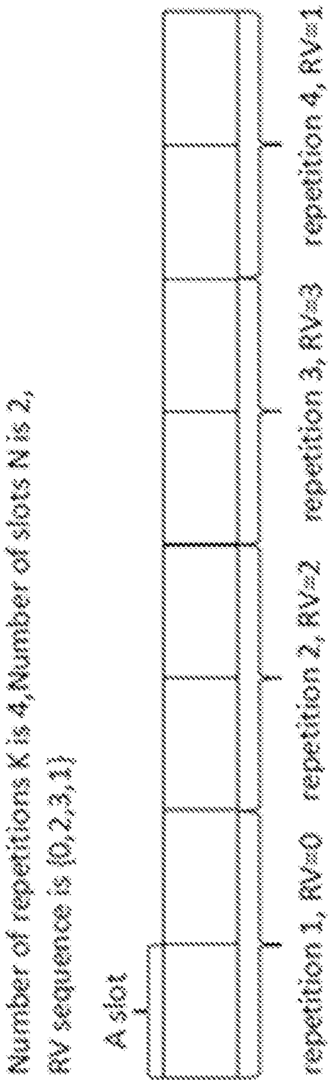
FIG. 4A shows an example of RV and repetition pattern for transport block (TB) processing over multiple consecutive slots with repetition.
Figure 4B:
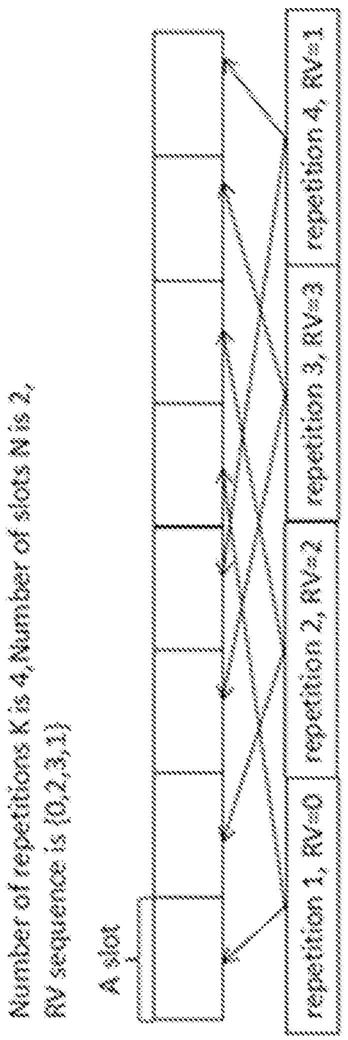
FIG. 4B shows another example of RV and repetition pattern for TB processing over multiple inconsecutive slots with repetition.

FIG. 4A shows an example of RV and repetition pattern for transport block (TB) processing over multiple consecutive slots with repetition. FIG. 4B shows another example of RV and repetition pattern for TB processing over multiple inconsecutive slots with repetition.

Method 1: The RV index for i th repetition of K is equal to: (mod(K−1, M)+1)th value in RV sequence, where M is the length of RV sequence. For instance, when the number of repetitions K is 4, number of slots is 2, RV pattern is {0,2,3,1}, as shown in FIG. 4A. Each repetition includes 2 consecutive slots, the RV cycling for each repetition is {0,2,3,1}.

Furthermore, each repetition includes 2 inconsecutive slots, the RV cycling for each repetition is {0,2,3,1}. As shown in FIG. 4B.

Figure 5:
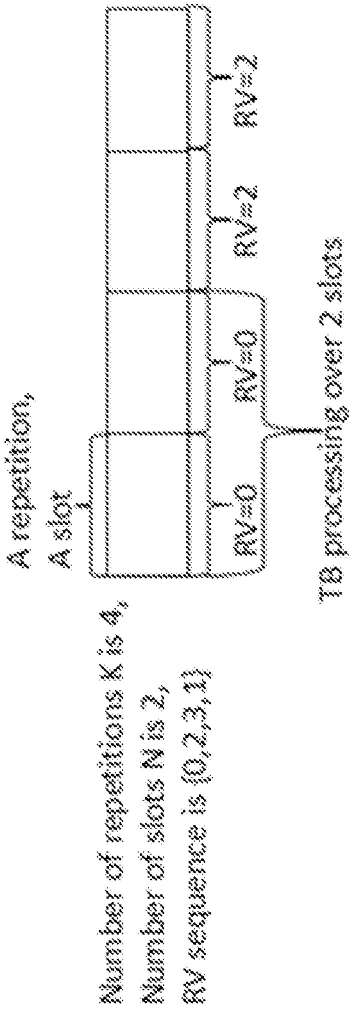
FIG. 5 shows an example of RV pattern for TB processing over multiple slots with repetition.
Figure 6:
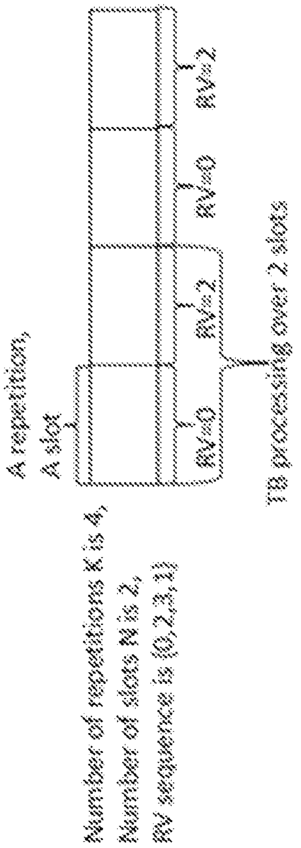
FIG. 6 shows another example of RV pattern for TB processing over multiple slots with repetition.

FIG. 5 shows an example of RV pattern for TB processing over multiple slots with repetition. FIG. 6 shows another example of RV pattern for TB processing over multiple slots with repetition.

Method 2: the RV is same within multiple slots for TB processing, the number of K' is determined according to the number of repetitions K and the number of slots N, the number of K' is equal to ceil(K/N), the RV index for i th repetition K' is equal to: (mod(K−1,M)+1)th value in RV sequence, where, M is the length of RV sequence. For instance, when the number of repetitions K is 4, number of slots is 2, RV pattern is {0,2,3,1}, as shown in FIG. 5. Each repetition includes 1 slot, the RV cycling for each repetition is {0,0,2,2}.

For CG PUSCH transmission, the RV index within multiple slots for TB processing should be the same for help receiver perform timing and frequency tracking, the multiple slots for TB processing may be regarded as a bundle, then RV cycling in the multiple bundles. For instance, when the number of repetitions K is 4, the number of slots for TB processing is 2, RV pattern is {0,2,3,1}, as shown in FIG. 5. The first 2 slots regard as the first bundle and the last 2 slots regard as the second bundle, the RV index for the first bundle is 0 and the RV index for the second bundle is 2, then the RV index is {0,0,2,2} for each repetition, respectively.

Furthermore, the RV is the same or different within multiple slots for TB processing and the RV cycling in multiple slots for TB processing. For instance, when the number of repetitions K is 4, number of slots is 2, RV pattern is {0,2,3,1}, as shown in FIG. 6. Each repetition includes 1 slot, the RV cycling for each repetition is {0,2,0,2}.

Example Embodiment 4

The procedures for TBS determination for PUSCH in the current standard are as below:

1) The UE first determines the number of REs (NRE) within the slot:

A UE first determines the number of REs allocated for PUSCH within a PRB $$(N'_{RE})$$

by $$N'_{RE} = N^{RB}_{sc} \cdot N^{sh}_{symb} - N^{PRB}_{DMRS} - N^{PRB}_{oh}, \text{ where } N^{RB}_{sc} = 12$$

is the number of subcarriers in the frequency domain in a physical resource block, $$N^{sh}_{symb}$$

is the number of symbols L of the PUSCH allocation according to Clause 6.1.2.1 for scheduled PUSCH or Clause 6.1.2.3 for configured PUSCH, $$N^{PRB}_{DMRS}$$

is the number of REs for DM-RS per PRB in the allocated duration including the overhead of the DM-RS CDM groups without data, as described for PUSCH with a configured grant in Clause 6.1.2.3 or as indicated by DCI format 0_1 or DCI format 0_2 or as described for DCI format 0_0 in Clause 6.2.2, and $$N_{oh}^{PRB}$$

is the overhead configured by higher layer parameter xOverhead in PUSCH-ServingCellConfig. If the $$N_{oh}^{PRB}$$

is not configured (a value from 6, 12, or 18), the $$N_{oh}^{PRB}$$

is assumed to be 0. For Msg3 or MsgA PUSCH transmission the $$N_{oh}^{PRB}$$

is always set to 0. In case of PUSCH repetition Type B, $$N_{DMRS}^{PRB}$$

is determined assuming a nominal repetition with the duration of L symbols without segmentation.

A UE determines the total number of REs allocated for PUSCH ($N_{RE}$) by $$N_{RE} = \min(156, N'_{RE}) \cdot n_{PRB}$$

where $n_{PRB}$ is the total number of allocated PRBs for the UE.

2) Unquantized intermediate variable (Ninfo) is obtained by $N_{info}=N_{RE} \cdot R \cdot Q_m \cdot \upsilon$.

If $N_{info} \leq 3824$

Use step 3 as the next step of the TBS determination in TS 38.214 else

Use step 4 as the next step of the TBS determination in TS 38.214 end if $N_{RE}$ is a parameter which used for TBS calculation.

When TB processing multiple slots is enabled, the methods of TBS calculation need to be determined. The disclosed technology can be used to implement the following methods.

Option1: the TBS is calculated based on a single slot for TB processing over multiple slots. In some embodiments, the number of available REs is the total REs of the PUSCH within a slot excluding the reference signals. In some embodiments, the single slot is the first slot of the multiple slots for TB processing. In some embodiments, the single slot is the any one slot of the multiple slots for TB processing.

Option2: the TBS is calculated based on multiple slots, the number of available REs is the total REs of the PUSCH within all the slots excluding the reference signals for the TB processing. In some embodiments, the total available REs cannot be larger than a threshold value H, where, the value of H can be determined based on a single slot within multiple slots for TB processing or indicating by gNB explicitly.

Furthermore, the number of resource blocks (RBs) allocation may be reduced corresponding when TB processing over multiple slots. Then some bits of FDRA fields in DCI may be saved when the number of RB allocation is limited.

Option1: the size of FDRA field in DCI is related to the number of slots which the TB processing, the number of RBs is not larger than N_RB/N. where, N_RB is the max number of bandwidth part (BWP), N is the number of slots which the TB processing. In the current standard, the length of RBs is equal to N, ceil (log 2(N(N+1)/2)) bits was needed for frequency domain resource allocation (FDRA) if the RB allocation without limitation. Ceil (log 2(N*Y−Y*(Y−1)/2)) bits was needed for FDRA if the RB allocation when the number of RBs allocation is smaller than Y. The bits of FDRA field with different Y are shown below.

In current Spec, the RIV (Resource indicator value) based on the binary tree (segment function) is not linearly increasing with S+L, where, S is the starting point of RBs, L is the length of the RBs. A new formula used to calculate RIV is needed. The following formula may be used to implement some embodiments of the disclosed technology:

$$RIV=(N-L+2)*(N-L+1)/2-S-1-(N-Y+1)*(N-Y)/2$$

In some embodiments, formula based on binary tree was reused and the bit saved through limitation the flexible and length of resource allocation. The formula for FDRA size calculation is showed below:

$$\text{FDRA size}=\text{ceil}(\log 2(N(N+1)/2))$$

For this method, additional indication for a set of BWPs is needed. For instance, the number of slots for TB processing is equal to 4, and the BWP divided into 4 sets, the size of each set is equal to round (BWP/4), record as BWP_set1, BWP_set2, BWP_set3, BWP_set4. Then, which a set of BWPs should be used for UE? A straightforward way is reusing some bits in FDRA field to indicate the set of BWPs, e.g., 2 bits in FDRA fields is used to indicate the BWP set, "00" is presenting BWP_set1, "01" is presenting BWP_set2, "10" is presenting BWP_set3, "11" is presenting BWP_set4. where, the start RB of each BWP set is equal to: 0+round (BWP_RB/N)*(Ni−1). BWP_RB is the number RB of the BWP, Ni is the index of BWP_seti.

Example Embodiment 5

In the current standard, the data rate limitation per CC is given as follows:

For a j-th serving cell, if higher layer parameter processingType2Enabled of PUSCH-ServingCellConfig is configured for the serving cell and set to enable, or if at least one IMCS>W for a PUSCH, where W=28 for MCS tables 5.1.3.1-1 and 5.1.3.1-3, and W=27 for MCS tables 5.1.3.1-2, 6.1.4.1-1, and 6.1.4.1-2, or if it is an actual repetition for PUSCH repetition Type B, the UE is not required to handle PUSCH transmissions, if the following condition is not satisfied:

$$\frac{\sum_{m=0}^{M-1} V_{j,m}}{L \times T_s^{\mu}} \le DataRateCC$$

where

L is the number of symbols assigned to the PUSCH

M is the number of TB in the PUSCH $$T_s^{\mu} = \frac{10^{-3}}{2^{\mu} \cdot N_{symb}^{slot}}$$

where μ is the numerology of the PUSCH for the m-th TB, $$V_{j,m} = C' \cdot \left\lfloor \frac{A}{C} \right\rfloor$$

A is the number of bits in the transport block as defined in Clause 6.2.1 [5, TS 38.212]

C is the total number of code blocks for the transport block defined in Clause 5.2.2 [5, TS 38.212]

C' is the number of scheduled code blocks for the transport block as defined in Clause 5.4.2.1 [5, TS 38.212]

DataRateCC [Mbps] is computed as the maximum data rate for a carrier in the frequency band of the serving cell for any signaled band combination and feature set consistent with the serving cell, where the data rate value is given by the formula in Clause 4.1.2 in [13, TS 38.306], including the scaling factor f(i) each actual repetition for PUSCH repetition type B is treated as one PUSCH.

When TB processing over multiple slots is enabled, the values of L and A should be determined. The disclosed technology can be used to implement the following methods.

Option 1: L is defined as the number of symbols in one slot within multiple slots for TB processing and the TBS (i.e., A) is based on one slot within multiple slots for TB processing.

Option 2: L is defined as the number of symbols in multiples slots for TB processing and the TBS (i.e., A) is based on multiple slots for TB processing.

Option 3: L is defined as the number of symbols in one slot within multiple slots for TB processing and the TBS (i.e., A) is based on multiple slots for TB processing.

Option 4: L is defined as the number of symbols in multiple slots for TB processing and the TBS (i.e., A) is based on one slot within multiple slots for TB processing.

Furthermore, If L is defined as the number of symbols in one slot and the TBS (i.e., A) is based on multiple slots with no limitation, then it is possible the data rate is high than maximum data rate. This should be avoided. On the other hand, the TBS should not be larger than the maximum size of UE's buffer. Using the date rate to limit the TB S should be considered.

Option 1: when L is defined as the number of symbols in multiple slots for TB processing and the TBS (i.e., A) is based on multiple slots. The following formula should be satisfied:

$$N * \frac{\sum_{m=0}^{M-1} V_{j,m}}{L \times T_s^{\mu}} \le DataRateCC$$

where, N is the number of slots for TB processing. The TBS (i.e.A) will be limited by the date rate, the maximum TBS should not be larger than DataRataCC*L*T/N Option 2: when L is defined as the number of symbols in one slot within multiple slots for TB processing and the TBS (i.e., A) is based on multiple slots for TB processing. The following formula should be satisfied:

$$\frac{\sum_{m=0}^{M-1} V_{j,m}}{L \times T_s^{\mu}} \le DataRateCC$$

where, N is the number of slots for TB processing. The TBS (i.e.A) will be limited by the date rate, the maximum TBS should not be larger than DataRataCC*L*T. Furthermore, when L is defined as the number of symbols in one slot within multiple slots for TB processing and the TBS (i.e., A) is based on one slot within multiple slots for TB processing and L is defined as the number of symbols in multiple slots for TB processing and the TBS (i.e., A) is based on one slot within multiple slots for TB processing. The above formula should also be satisfied.

If we want to use the date rate to limit the TBS, some embodiments can define L as L'/N or N*floor(L'/N), where L' is the number of symbols allocated for the PUSCH in one slot, N is the number of slots. That is, the data rate limitation is used to limit the actual TBS. In other words, since L becomes smaller, the TBS has to be smaller in order to not increase the data rate the UE can support.

For the CA case, the data rate limit as below. Within a cell group, a UE is not required to handle PUSCH(s) transmissions in slot sj in serving cell-j, and for j=0, 1, 2 . . . J−1, slot sj overlapping with any given point in time, if the following condition is not satisfied at that point in time:

$$\sum_{j=0}^{J-1} \frac{\sum_{m=0}^{M-1} V_{j,m}}{T_{slot}^{\mu(j)}} \le DataRate,$$

where

J is the number of configured serving cells belong to a frequency range for the j-th serving cell, M is the number of TB(s) transmitted in slot-sj.

$T_{slot}^{\mu(j)} = 10^{-3}/2^{\mu(j)}$, where μ(j) is the numerology for PUSCH(s) in slot sj of the j-th serving cell.

for the m-th TB, $$V_{j,m} = C' \cdot \left\lfloor \frac{A}{C} \right\rfloor$$

A is the number of bits in the transport block as defined in Clause 6.2.1 [5, TS 38.212]

C is the total number of code blocks for the transport block defined in Clause 5.2.2 [5, TS 38.212].

C' is the number of scheduled code blocks for the transport block as defined in Clause 5.4.2.1 [5,38.212]

DataRate [Mbps] is computed as the maximum data rate summed over all the carriers in the frequency range for any signaled band combination and feature set consistent with the configured servings cells, where the data rate value is given by the formula in Clause 4.1.2 in [13, TS 38.306], including the scaling factor f(i).

The same ways are reused for the data rate limitation per CC.

Option 1: $T_{slot}^{\mu(j)}$ is defined as one slot within multiple slots for TB processing and the TBS (i.e., A) is based on one slot within multiple slots for TB processing. Where, μ(j) is the numerology for PUSCH(s) in slot(s) of the j-th serving cell.

Option 2: $T_{slot}^{\mu(j)}$ is defined as the number of multiples slots for TB processing and the TBS (i.e., A) is based on multiple slots for TB processing. Where, μ(j) is the numerology for PUSCH(s) in slot(s) of the j-th serving cell.

Option 3: $T_{slot}^{\mu(j)}$ is defined as one slot within multiple slots for TB processing and the TBS (i.e., A) is based on multiple slots for TB processing. Where, μ(j) is the numerology for PUSCH(s) in slot(s) of the j-th serving cell.

Option 4: $T_{slot}^{\mu(j)}$ is defined as the number of symbols in multiple slots for TB processing and the TBS (i.e., A) is based on one slot within multiple slots for TB processing. Where, μ(j) is the numerology for PUSCH (s) in slot(s) of the j-th serving cell.

Using the date rate to limit the TBS should be considered.

Method 1: when $T_{slot}^{\mu(j)}$ is defined as multiple slots and the TBS (i.e., A) is based on multiple slots. The following formula should be satisfied:

$$N * \sum_{j=0}^{J-1} \frac{\sum_{m=0}^{M-1} V_{j,m}}{T_{slot}^{\mu(j)}} \leq DataRate$$

where, N is the number of slots for TB processing. The TBS (i.e.A) will be limited by the date rate, the maximum TBS should not be larger than DataRataCC*L*T/N.

Method 2: When $T_{slot}^{\mu(j)}$ is defined as the number of symbols in one slot within multiple slots for TB processing and the TBS (i.e., A) is based on multiple slots for TB processing.

In some embodiments, if A is the TBS based on multiple slots, it may exceed the maximum data rate. To avoid this, for TB processing over multiple slots, $T_{slot}^{\mu(j)}$ is changed to $T_{slot}^{\mu(j)}/N$, where N is the number of multiple slots. That is, the data rate limitation is used to limit the actual TBS. In other words, since $T_{slot}^{\mu(j)}$ becomes smaller, the TBS has to be smaller in order to not increase the data rate the UE can support.

Example Embodiment 6

Figure 7:
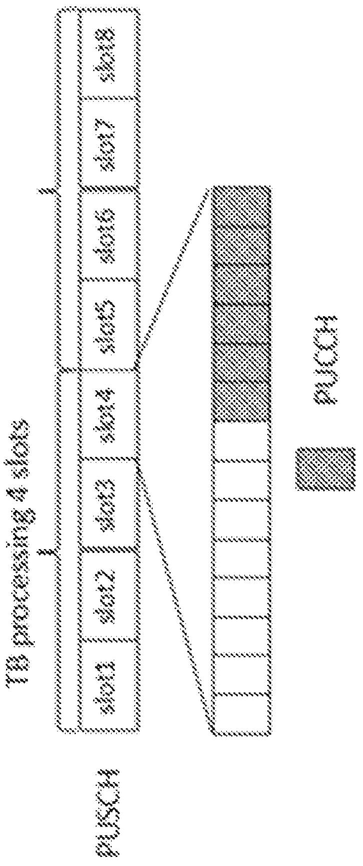
FIG. 7 shows another example of physical uplink control channel (PUCCH) collision with PUSCH.

FIG. 7 shows another example of physical uplink control channel (PUCCH) collision with PUSCH.

When TB processing over multiple slots is enabled, and UE also sends UCI information during the one or more slots within multiple slots for TB processing. The UCI information may be multiplexed on PUSCH. The disclosed technology can be used to implement the following methods.

Option 1: the UCI is multiplexed on the slot which is overlapped with the PUCCH, where the slot for UCI multiplexing includes DMRS (Dedicated Demodulation Reference Signals) symbols.

Option 2: the UCI is multiplexed on the slot which is not overlapped with the PUCCH. In some embodiments, the slot is the nearest one to the starting symbol or the ending symbol of the PUCCH in the time domain. For instance, as shown in FIG. 7, TB of PUSCH processing over 4 slots, PUCCH transmission is collided to PUSCH on slot 4. the UCI is multiplexed on slot 3. Furthermore, the slot includes DMRS symbols. Furthermore, the first symbol within slot for UCI multiplexing should be satisfied the timeline, the timeline is defined in section 9.2.5 in TS 38.213.

Option 3: the UCI is multiplexed on multiple slots for TB processing which is overlapped with the PUCCH or not. Furthermore, the UCI is multiplexed on multiple slots from back to front, where, the last symbol within multiple slots for UCI multiplexing should be satisfied the timeline, the timeline is defined in section 9.2.5 in TS 38.213. Furthermore, the first slot for UCI multiplexing include DMRS. Furthermore, the UCI is multiplexed on multiple slots from front to back, where, the first symbol within multiples slots for UCI multiplexing should be satisfied the timeline, the timeline is defined in section 9.2.5 in TS 38.213. Furthermore, the first slot for UCI multiplexing include DMRS.

Furthermore, if the PUCCH transmission is repeated, the one or multiple slots within multiple slots for TB processing which is overlapped with PUCCH in time domain, the whole slots for TB processing was omitted. Furthermore, the remaining part of slots which is not overlapped with PUCCH in time domain within multiple slots for TB processing may be transmitted.

For HARQ-ACK transmission on PUSCH not using repetition type B with UL-SCH, the number of coded modulation symbols per layer for HARQ-ACK transmission, denoted as $$Q'_{ACK},$$

is determined as follows:

$$Q'_{ACK} = \min\left\{\left\lceil \frac{(O_{ACK}+L_{ACK})\cdot \beta_{offset}^{PUSCH}\cdot \sum_{l=0}^{N_{symb,all}^{PUSCH}-1} M_{sc}^{UCI}(l)}{\sum_{r=0}^{C_{UL\text{-}SCH}-1} K_r}\right\rceil, \left\lceil \alpha\cdot \sum_{l=l_0}^{N_{symb,all}^{PUSCH}-1} M_{sc}^{UCI}(l)\right\rceil\right\}$$

where:

$O_{ACK}$ is the number of HARQ-ACK bits;

if $O_{ACK} \geq 360$, $L_{ACK}=11$; otherwise $L_{ACK}$ is the number of CRC bits for HARQ-ACK determined according to Clause 6.3.1.2.1;

$$\beta_{offset}^{PUSCH} = \beta_{offset}^{HARQ\text{-}ACK};$$

$C_{UL\text{-}SCH}$ is the number of code blocks for UL-SCH of the PUSCH transmission;

if the DCI format scheduling the PUSCH transmission includes a CBGTI field indicating that the UE shall not transmit the r-th code block, $K_r$=0; otherwise, $K_r$ is the r-th code block size for UL-SCH of the PUSCH transmission;

$$M_{sc}^{PUSCH}$$

is the scheduled bandwidth of the PUSCH transmission, expressed as a number of subcarriers;

$$M_{sc}^{PT\text{-}RS}(l)$$

is the number of subcarriers in OFDM symbol l that carries PTRS, in the PUSCH transmission;

$$M_{sc}^{UCI}(l)$$

is the number of resource elements that can be used for transmission of UCI in OFDM symbol l, for $$l = 0, 1, 2, \ldots, N_{symb,all}^{PUSCH} - 1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l) = 0;$$

for any OFDM symbol that does not carry DMRS of the PUSCH, $$M_{sc}^{UCI}(l) = M_{sc}^{PUSCH} - M_{sc}^{PT\text{-}RS}(l),$$

α is configured by higher layer parameter scaling;

$l_0$ is the symbol index of the first OFDM symbol that does not carry DMRS of the PUSCH, after the first DMRS symbol(s), in the PUSCH transmission.

When the TB processing over multiple slots is enabled, the number of coded modulation symbols for each layer of UCI information should be determined. The disclosed technology can be used to implement the following methods.

Option 1: when the $$\sum_{r=0}^{C_{UL-SCH}-1} k_r$$

is determined based on multiple slots for TB processing, $$\sum_{l=0}^{N_{symbol,all}^{PUSCH}-1} M_{sc}^{UCI}(l)$$

is determined based on multiple slots for TB processing, then, $$\sum_{l=l0}^{N_{symbol,all}^{PUSCH}-1} M_{sc}^{UCI}(l)$$

is determined based on a single slot within multiple slots for TB processing, Furthermore, $$\sum_{l=10}^{N_{symbol,all}^{PUSCH}-1} M_{sc}^{UCI}(l)$$

is determined based on multiple slots for TB processing.

Option 2: when the $$\sum_{r=0}^{C_{UL-SCH}-1} k_r$$

is determined based on single slot within multiple slots for TB processing, then, $$\sum_{l=0}^{N_{symbol,all}^{PUSCH}-1} M_{sc}^{UCI}(l)$$

is determined based on single slot within multiple slots for TB processing, $$\sum_{l=l0}^{N_{symbol,all}^{PUSCH}-1} M_{sc}^{UCI}(l)$$

is determined based on a single slot within multiple slots for TB processing. Furthermore, $$\sum_{l=l0}^{N_{symbol,all}^{PUSCH}-1} M_{sc}^{UCI}(l)$$

is determined based on a single slot within multiple slots for TB processing.

Option 3: when the $$\sum_{r=0}^{C_{UL-SCH}-1} k_r$$

is determined based on a single slot within multiple slots for TB processing, $$\sum_{l=0}^{N_{symbol,all}^{PUSCH}-1} M_{sc}^{UCI}(l)$$

is determined based on single slot within multiple slots for TB processing, then, $$\sum_{l=l0}^{N_{symbol,all}^{PUSCH}-1} M_{sc}^{UCI}(l)$$

is determined based on a single slot within multiple slots for TB processing, Furthermore, $$\sum_{l=l0}^{N_{symbol,all}^{PUSCH}-1} M_{sc}^{UCI}(l)$$

is determined based on multiple slots for TB processing.

Option 4: when the $$\sum_{r=0}^{C_{UL-SCH}^{-1}} k_r$$

is determined based on single slot within multiple slots for TB processing, then, $$\sum_{l=0}^{N_{symbol,\,all}^{PUSCH}-1} M_{sc}^{UCI}(l)$$

is determined based on multiple slots for TB processing, $$\sum_{l=l0}^{N_{symbol,\,all}^{PUSCH}-1} M_{sc}^{UCI}(l)$$

is determined based on a single slot within multiple slots for TB processing. Furthermore, $$\sum_{l=l0}^{N_{symbol,all}^{PUSCH}-1} M_{sc}^{UCI}(l)$$

is determined based on multiple slots for TB processing.

Example Embodiment 7

Figure 8:
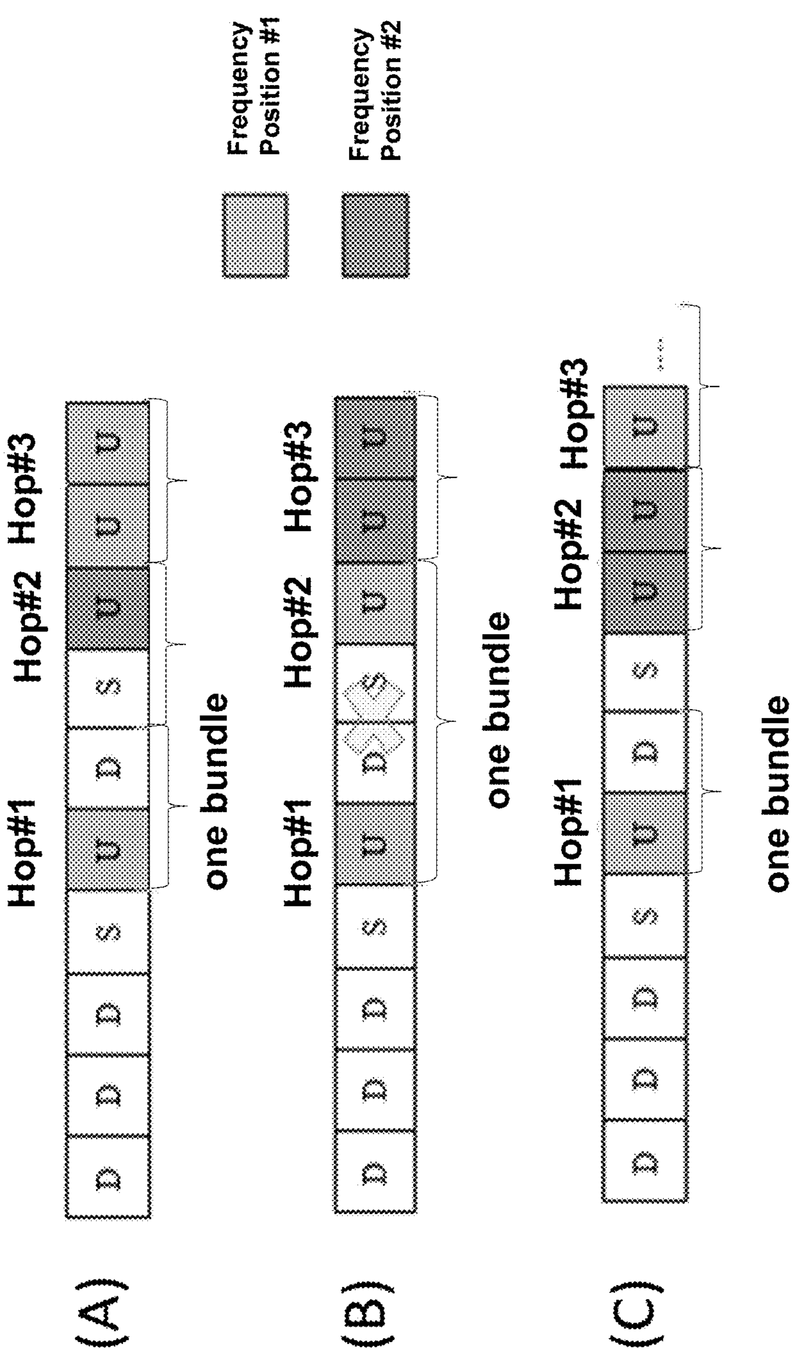
FIG. 8 shows different inter-slot FH patterns in the time domain for PUSCH with 8 repetitions in TDD, and inter-slot FH bundling size of 2.

FIG. 8 shows different inter-slot FH patterns in the time domain for PUSCH with 8 repetitions in TDD, and inter-slot FH bundling size of 2, where (A) indicates Pattern 1 where inter-slot FH bundling is based on consecutive slots, (B) indicates Pattern 2 where inter-slot FH bundling is based on available slots, and (C) indicates Pattern 3 where inter-slot FH bundling is based on each set of consecutive available slots.

For TDD operations, the joint channel estimation may be only performed among PUSCH transmissions in consecutive UL slots. Depending on TDD configuration and definition of one FH bundle, the inter-slot FH pattern may be different. For instance, as shown in FIG. 8, three inter-slot FH patterns are given based on bundling size of 2, and FH occurs between FH bundles.

Regarding Pattern 1, the inter-slot FH bundling is based on consecutive slots. That is, one bundle contains consecutive slots which may be either DL slot or UL slot. For Pattern 2, the inter-slot FH bundling is based on available slots. That is, one bundle can only include the slots for actual PUSCH transmission(s). For Pattern 3, the inter-slot FH bundling is based on each set of consecutive available slots. That is, the bundle is re-partitioned in each set of consecutive UL slots. Although it may seem there is not much difference among above three patterns, since they all have three hops while the joint channel estimation can only be done in one hop. However, there may be differences if different TDD configuration or different bundling size is assumed. For instance, if the bundling size is 4, then Pattern 3 may enable the joint channel estimation in one hop with three UL slots. In some implementations, a cross-slot channel estimation is performed in the available consecutive resources within a bundle. In some implementations, above methods are also used for PUCCH transmission or Msg 3 transmission.

Example Embodiment 8

For Msg3 initial transmission, it can be scheduled by RAR UL grant or fallback RAR UL grant. The time domain resources, e.g., the starting symbol, number of symbols used, mapping type etc., are first configured or predefined in one TDRA (Time Domain Resource Allocation) table, which has multiple rows in the table and each row contains one time domain resource for PUSCH scheduling. Then, one bit field in RAR UL grant or fallbackRAR UL grant are used to indicate one row of time domain resource to the UE.

If the repetition for Msg3 initial transmissions is introduced, the repetition factor can be included in a new TDRA table, e.g., adding one column in the TDRA table for repetition factor. Then, one bit field in RAR UL grant or fallbackRAR UL grant indicates one row of the TDRA table which also contains the repetition factor to the UE.

For the new TDRA table, it may be introduced in pusch-ConfigCommon or pusch-Config or both pusch-ConfigCommon and pusch-Config. Then, depending on whether the new TDRA table or legacy tables is configured or not, TDRA table selection for Msg3 initial transmission should be determined.

TDRA Table Selection for PUSCH Scheduled by RAR UL Grant or fallbackRAR UL Grant:

In some embodiments, the new TDRA Table is named as PUSCH-TimeDomainResourceAllocationList-r17.

If PUSCH-TimeDomainResourceAllocationList-r17 in pusch-ConfigCommon is introduced, TDRA table selection should be determined. An example is shown in Table 2.1-1 below.

TABLE 2.1-1

Applicable PUSCH time domain resource allocation for PUSCH scheduled by MAC RAR or MAC fallback RAR

| RNTI | pusch-ConfigCommon includes pusch-TimeDomainAllocationList | pusch-ConfigCommon includes pusch-TimeDomainAllocationList-r17 | pusch-Config includes pusch-TimeDomainAllocationList | PUSCH time domain resource allocation to apply |
|---|---|---|---|---|
| PUSCH scheduled by MAC RAR or MAC fallback RAR | No | No | — | Default A |
| | Yes | No | | pusch-TimeDomainAllocationList provided in pusch-ConfigCommon |
| | No/Yes | Yes | | pusch-TimeDomainAllocationList-r17 provided in pusch-ConfigCommon |

If PUSCH-TimeDomainResourceAllocationList-r17 is additionally included in pusch-Config, TDRA table selection should be determined. An example is shown in Table 2.1-2 below. In some embodiments, UE can use the TDRA table in pusch-Config for PUSCH scheduled by MAC RAR or MAC fallback RAR. That is, the last row in brackets in Table 2.1-2 is used. In some embodiments, UE cannot use the TDRA table in pusch-Config for PUSCH scheduled by MAC RAR or MAC fallback RAR. That is, the last row in brackets in Table 2.1-2 is not used.

TABLE 2.1-2

Applicable PUSCH time domain resource allocation for PUSCH scheduled by MAC RAR or MAC fallback RAR

| RNTI | pusch-ConfigCommon includes pusch-TimeDomainAllocationList | pusch-ConfigCommon includes pusch-TimeDomainAllocationList-r17 | pusch-Config includes pusch-TimeDomainAllocationList | pusch-Config includes pusch-TimeDomainAllocationList-r17 | PUSCH time domain resource allocation to apply |
|---|---|---|---|---|---|
| PUSCH scheduled by MAC RAR or MAC fallback RAR | No | No | — | — | Default A |
| | Yes | No | | | pusch-TimeDomainAllocationList provided in pusch-ConfigCommon |
| | No/Yes | Yes | | | pusch-TimeDomainAllocationList-r17 provided in pusch-ConfigCommon |
| | [No/Yes] | [Yes/No] | | [Yes] | [pusch-TimeDomainAllocationList-r17 provided in pusch-Config] |

TDRA Table Selection for Msg3 Re-Transmission

For Msg3 re-transmission, is scheduled by DCI format 0_0 scrambled by TC-RNTI. The time domain resources, e.g., the starting symbol, number of symbols used, mapping type etc., are first configured or predefined in one TDRA (Time Domain Resource Allocation) table, which has multiple rows in the table and each row contains a single time domain resource for PUSCH scheduling. Then, a single bit field in DCI format 0_0 scrambled by TC-RNTI is used to indicate one row of time domain resource to the UE.

If repetition for Msg3 re-transmission is introduced, the repetition factor can be included in a new TDRA table, e.g., adding one column in the TDRA table for repetition factor. Then, one bit field in DCI format 0_0 scrambled by TC-RNTI indicates one row of the TDRA table which also contains the repetition factor to the UE.

For the new TDRA table, it may be introduced in pusch-ConfigCommon or pusch-Config or both pusch-ConfigCommon and pusch-Config. Then, depending on whether the new TDRA table or legacy tables is configured or not, TDRA table selection for Msg3 re-transmission should be determined.

If PUSCH-TimeDomainResourceAllocationList-r17 in pusch-ConfigCommon is introduced, TDRA table selection should be determined. An example is shown in Table 2.2-1 and Table 2.2-2 for Case 1 and Case 2, respectively.

Case 1: DCI format 0_0 scrambled with TC-RNTI, and 'Any common search space associated with CORESET 0'.

Case 2: DCI format 0_0 scrambled with TC-RNTI, and 'Any common search space not associated with CORESET 0, DCI format 0_0 in UE specific search space'

TABLE 2.2-1

Applicable PUSCH time domain resource allocation for Case 1

| pusch-ConfigCommon includes pusch-TimeDomainAllocationList-r17 | pusch-ConfigCommon includes pusch-TimeDomainAllocationList | pusch-Config includes pusch-TimeDomainAllocationList | PUSCH time domain resource allocation to apply |
| --- | --- | --- | --- |
| No | No | | Default A |
| Yes | No/Yes | | pusch-TimeDomainAllocationList-17 provided in pusch-ConfigCommon |
| No | Yes | | pusch-TimeDomainAllocationList provided in pusch-ConfigCommon |

TABLE 2.2-2

Applicable PUSCH time domain resource allocation for Case 2

| pusch-ConfigCommon includes pusch-TimeDomainAllocation List-r17 | pusch-ConfigCommon includes pusch-TimeDomainAllocation List | pusch-Config includes pusch-TimeDomainAllocation List | PUSCH time domain resource allocation to apply |
| --- | --- | --- | --- |
| No | No | No | Default A |
| Yes | No/Yes | No | pusch-TimeDomainAllocationList-17 provided in pusch-ConfigCommon |
| No | Yes | No | pusch-TimeDomainAllocationList provided in pusch-ConfigCommon |
| No | No | Yes | pusch-TimeDomainAllocationList provided in pusch-Config |
| Yes | No/Yes | Yes | pusch-TimeDomainAllocationList-17 provided in pusch-ConfigCommon Or pusch-TimeDomainAllocationList provided in pusch-Config |

If PUSCH-TimeDomainResourceAllocationListForDCI-Format0-0-r17 in pusch-Config is additionally introduced, TDRA table selection should be determined. An example is shown in Table 2.2-3 and Table 2.2-4 for Case 1 and Case 2, respectively.

TABLE 2.2-3

Applicable PUSCH time domain resource allocation for Case 1

| pusch-ConfigCommon includes pusch-TimeDomainAllocationList | pusch-ConfigCommon includes pusch-TimeDomainAllocationList-r17 | pusch-Config includes pusch-TimeDomainAllocationList | pusch-Config includes pusch-TimeDomainAllocationListForDCI-Format0-0-r17 | PUSCH time domain resource allocation to apply |
| --- | --- | --- | --- | --- |
| No | No | — | — | Default A |
| No/Yes | Yes | | | pusch-TimeDomainAllocationList-17 provided in pusch-ConfigCommon |
| Yes | No | | | pusch-TimeDomainAllocationList provided in pusch-ConfigCommon |

TABLE 2.2-4

Applicable PUSCH time domain resource allocation for Case 2

| pusch-ConfigCommon includes pusch-TimeDomainAllocation List | pusch-ConfigCommon includes pusch-TimeDomainAllocationList-r17 | pusch-Config includes pusch-TimeDomainAllocationList | pusch-Config includes pusch-TimeDomainAllocationListForDCI-Format0-0-r17 | PUSCH time domain resource allocation to apply |
|---|---|---|---|---|
| No | No | No | No | Default A |
| No/Yes | Yes | No | No | pusch-TimeDomainAllocationList-17 provided in pusch-ConfigCommon |
| Yes | No | No | No | pusch-TimeDomainAllocationList provided in pusch-ConfigCommon |
| No | No | Yes | No | pusch-TimeDomainAllocationList provided in pusch-Config |
| No/Yes | No/Yes | No/Yes | Yes | pusch-TimeDomainAllocationListForDCI-Format0-0-r17 in pusch-Config |
| No/Yes | Yes | Yes | No | pusch-TimeDomainAllocationList-17 provided in pusch-ConfigCommon Or pusch-TimeDomainAllocationList provided in pusch-Config |

In some embodiments, the above mentioned PUSCH-TimeDomainResourceAllocationList-r17 in pusch-Config is a same RRC parameter as pusch-ConfigPUSCH-TimeDomainResourceAllocationListForDCI-Format0-0-r17 in pusch-Config.

Default Table

If there are no TDRA tables that are configured by SIB1 or dedicated RRC signaling, a UE will use Default table for time domain resource allocation. However, there is no repetition factor in current Default table. To solve this issue, the disclosed technology can be used to implement the following methods.

Alternative 1: For CE UEs, PUSCH-TimeDomainResourceAllocationList-r17 has to be included in pusch-ConfigCommon.

Alternative 2: Add repetition factor in Default table.

Repetition factor is larger than 1 only for PUSCH duration of X OS. For instance, X=14.

Repetition factor is larger than 1 only for PUSCH mapping type A.

Alternative 3: If PUSCH-TimeDomainResourceAllocationList-r17 is not included in pusch-ConfigCommon, using other ways to determine the repetition factor Option 1: Using some bits in RAR UL grant to indicate the repetition factor.

Option 2: Using a default pre-defined value. For instance, the pre-defined value is 1 (i.e., no repetition is assumed in such a case).

Example Embodiment 9

If repetition is supported for Msg3 transmission, inter-slot FH can also be supported. In the following, some solutions on indicating the inter-slot FH are given. In some embodiments, the inter-slot FH could also be interpreted as inter-repetition FH.

Option 0: Introduce RRC parameter frequencyHopping in SIB message. If the field is absent, frequency hopping is not configured. The value intraSlot enables 'Intra-slot frequency hopping' and the value interSlot enables 'Inter-slot frequency hopping'.

frequencyHopping ENUMERATED {intraSlot, interSlot}

A UE may perform PUSCH frequency hopping, if the frequency hopping field in in RAR UL grant or DCI 0_0 format scrambled by TC-RNTI is set to 1, otherwise no PUSCH frequency hopping is performed.

Option 1: Re-interpreting the 1-bit FH flag in RAR UL grant or DCI 0_0 format scrambled by TC-RNTI.

If the value of the frequency hopping flag is 0, the UE transmits the PUSCH without intra-slot frequency hopping and with inter-slot frequency hopping; otherwise, the UE transmits the PUSCH with intra-slot frequency hopping and without inter-slot frequency hopping.

Alternatively, it can additionally introduce an RRC parameter in SIB1 indicating whether a UE supports FH or not. If a UE supports FH, it will further interpret the 1 bit FH flag in RAR UL grant or DCI 0_0 format scrambled by TC-RNTI as above. Otherwise, it would ignore the 1 bit FH flag or the 1 bit FH flag is re-interpreted as other meanings, e.g., whether enabling a cross-slot channel estimation.

Option 2: Introduce one bit inter-slot FH flag in RAR grant or DCI 0_0 format scrambled by TC-RNTI. Together with the 1 bit intra-slot FH, we can have the following combinations.

'00': No FH, including both intra/inter slot FH.

'01': Enable intra-slot, disable inter-slot FH

'10': Enable inter-slot, disable intra-slot FH

'11': reserved bit state. May be used for additional indication.

For the reserved bit state, it can additionally be used for other indication, e.g., enabling the cross-slot channel estimation.

Example Embodiment 10

If repetition is supported for Msg3 transmission, indication of RV pattern, cross-slot channel estimation or enabling of enhanced PUSCH repetition type A should also be determined.

In Rel-15/16, a UE will always use RV0 Msg3 initial transmission: A UE transmits a transport block in a PUSCH scheduled by a RAR UL grant in a corresponding RAR message using redundancy version number 0.

In case of Msg3 repetition, the following ways may be considered:

Option 1: Using a fixed RV cycling pattern, e.g., [0,2,3, 1].

| $n^{th}$ transmission occasion (repetition Type A) | | | |
|---|---|---|---|
| n mod 4 = 0 | n mod 4 = 1 | n mod 4 = 2 | n mod 4 = 3 |
| 0 | 2 | 3 | 1 |

Option 2: Using several bits, e.g., 1 or 2 bits, in RAR UL grant or fallbackRAR UL gran to indicate the RV index for the first repetition for Msg3 initial transmission.

Option 3: Using several bits in DCI format 1_0 with CRC scrambled by RA-RNTI to indicate the RV index for the first repetition for Msg3 initial transmission.

Option 4: Using some implicit methods to indicate the RV pattern for Msg3 initial transmission. For instance, using MCS bit field or PRACH configuration to indicate the RV index for the first repetition for Msg3 initial transmission.

Option 5: Using SIB message to indicate the RV pattern for Msg3 initial transmission. For instance, using SIB1 to indicate the RV index for the first repetition for Msg3 initial transmission.

In some embodiments, two or more above options can be used to indicate the RV pattern for Msg3 transmission.

For the cross-slot channel estimation related signaling, similar methods may be applied. More specifically, using some pre-defined method to define the behaviors for performing a cross-slot channel estimation, or using several bits, e.g., 1 or 2 bits, in RAR UL grant or fallback RAR UL grant to indicate related signaling for the cross-slot channel estimation for Msg3 initial transmission, or using several bits in DCI format 0_0 with CRC scrambled by TC-RNTI to indicate related signaling for the cross-slot channel estimation for Msg3 re-transmission, or using some implicit methods to indicate related signaling for the cross-slot channel estimation for Msg3 transmission, or using SIB message to indicate related signaling for the cross-slot channel estimation for Msg3 transmission, using two or more above methods to indicate the related signaling for the cross-slot channel estimation for Msg3 transmission.

For enhanced PUSCH repetition type A related signaling, similar methods may be applied. More specifically, using some pre-defined method to define the behaviors for enhanced PUSCH repetition type A, or using several bits e.g., 1 or 2 bits, in RAR UL grant or fallback RAR UL grant to indicate related signaling for enhanced PUSCH repetition type A for Msg3 initial transmission, or using several bits in DCI format 0_0 with CRC scrambled by TC-RNTI to indicate related signaling for enhanced PUSCH repetition type A for Msg3 re-transmission, or using some implicit methods to indicate related signaling for enhanced PUSCH repetition type A for Msg3 transmission, or using SIB message to indicate related signaling for enhanced PUSCH repetition type A for Msg3 transmission, using two or more above methods to indicate the related signaling for enhanced PUSCH repetition type A for Msg3 transmission.

Example Embodiment 11

Figure 9:
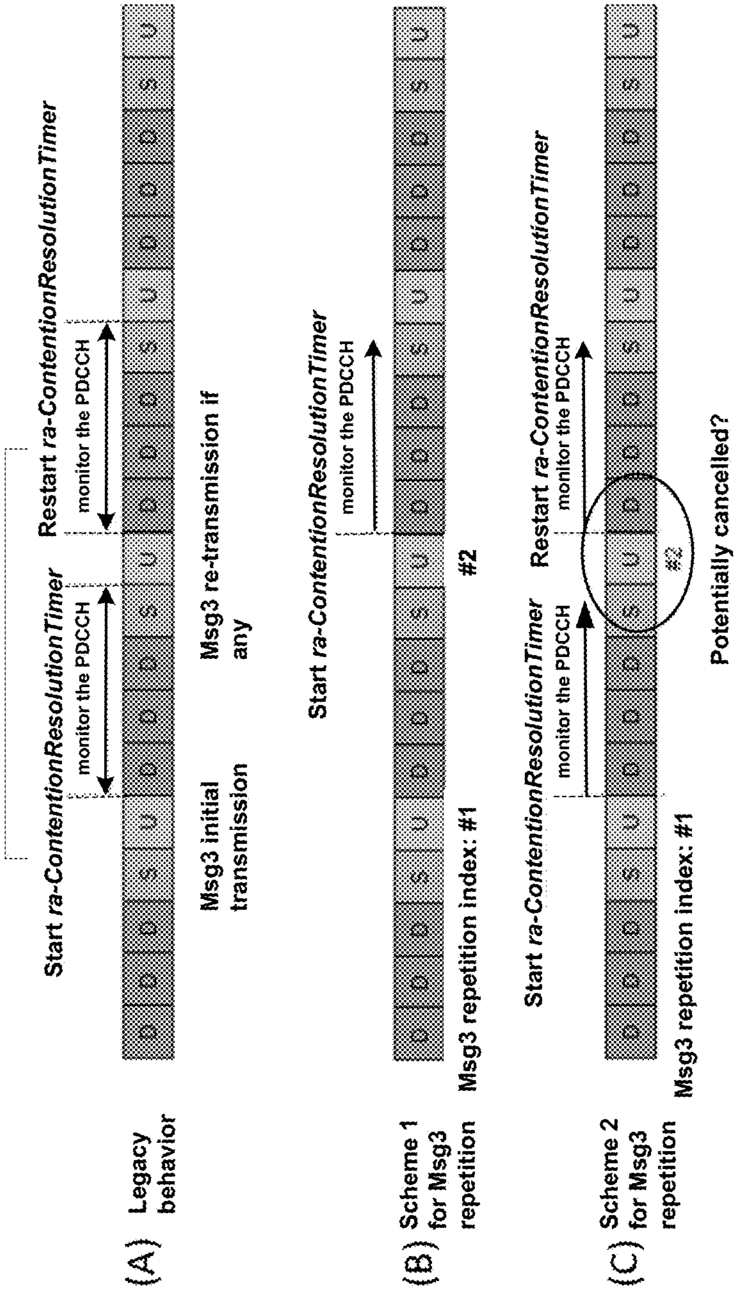
FIG. 9 shows a comparison of setting ra-ContentionResolutionTimer for legacy Msg3 transmission and Msg3 repetitions with repetition factor of 2, with TDD configuration of "DDDSU."
Figure 10:
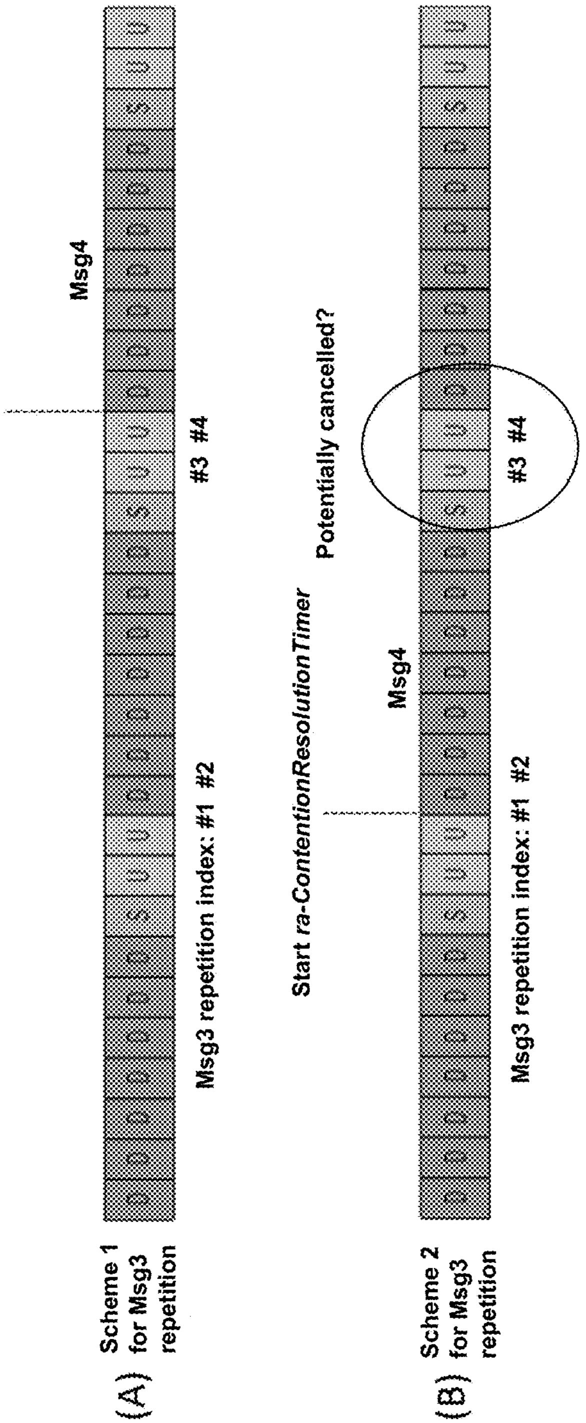
FIG. 10 shows a comparison of setting ra-ContentionResolutionTimer for legacy Msg3 transmission and Msg3 repetitions with repetition factor of 4, with TDD configuration of "DDDDDDDSUU."

FIG. 9 shows a comparison of setting ra-ContentionResolutionTimer for legacy Msg3 transmission and Msg3 repetitions with repetition factor of 2, with TDD configuration of "DDDSU." FIG. 10 shows a comparison of setting ra-ContentionResolutionTimer for legacy Msg3 transmission and Msg3 repetitions with repetition factor of 4, with TDD configuration of "DDDDDDDSUU."

In legacy, ra-ContentionResolutionTimer starts right after the end of Msg3 transmission. If Msg3 repetition is introduced, it is natural to start the timer after the end of all Msg3 repetitions. Some related specifications are as below.

5.1.5 Contention Resolution
Once Msg3 is transmitted, the MAC entity shall:
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
ra-ContentionResolutionTimer ENUMERATED { sf8, sf16, sf24, sf32, sf40, sf48, sf56, sf64},
ra-ContentionResolutionTimer
The initial value for the contention resolution timer (see TS 38.321 [3], clause 5.1.5). Value sf8 corresponds to 8 subframes, value sf16 corresponds to 16 subframes, and so on.

However, gNB may be able to successfully detects Msg3 based on the first repetition. If the timer can only be started at the end of repetitions, it could potentially increase the latency, which may be even larger than legacy re-transmission scheme. In addition, it would waste more UL resources for later-on repetitions.

In some embodiments, the timer is restarted after the end of each repetition. In some embodiments, it is only applied for TDD case.

A comparison of legacy behavior and enhanced behavior is shown in FIG. 9. For (A) Scheme 1 and (B) Scheme 2, two (2) repetitions are assumed for Msg3 repetition. In Scheme 1, the timer starts after the end of all Msg3 repetitions. In Scheme 2, the timer can restart after the end of each Msg3 repetition. If a reception of a PDCCH transmission is received before the second repetition, and if the duration between the end of the PDCCH and the starting point of the second repetition is larger than one timeline, UE shall cancel or may cancel the second repetition.

In some embodiments, the timer is restarted after the ending point of a couple/group of consecutive repetitions. In some embodiments, it is only applied for TDD case. This may prevent UE from keeping refreshing the timer unnecessarily at each repetition.

An example is shown in FIG. 10. For Scheme 1 and Scheme 2, 4 repetitions is assumed for Msg3 repetition. In Scheme 1, the timer starts after the end of all Msg3 repetitions. In scheme 2, the timer can restart after the end of each two consecutive Msg3 repetitions. If a reception of a PDCCH transmission is received before the third repetition, and if the duration between the end of the PDCCH and the starting point of the third repetition is larger than one timeline, UE shall cancel or may cancel the third repetition and the four repetition.

As discussed above, the disclosed technology can be implemented in some embodiments to distinguish between different schemes based on whether the number of repetitions is determined based on available UL slots or not. The disclosed technology can also be implemented in some embodiments to perform a transmission power determination for cross-slot channel estimate and TB processing multiple slots. The disclosed technology can also be implemented in some embodiments to perform TBS determination, number of slots indication, UCI multiplexing on PUSCH for TB processing multiple slot. The disclosed technology can also be implemented in some embodiments to perform TDRA table selection for Msg3 initial transmission. The disclosed technology can also be implemented in some embodiments to indicate the inter-slot/intra-slot FH, RV pattern, cross-slot channel estimation for Msg3 transmission. The disclosed technology can also be implemented in some embodiments to provide the starting point of ra-ContentionResolutionTimer for Msg3 repetitions.

Figure 11:
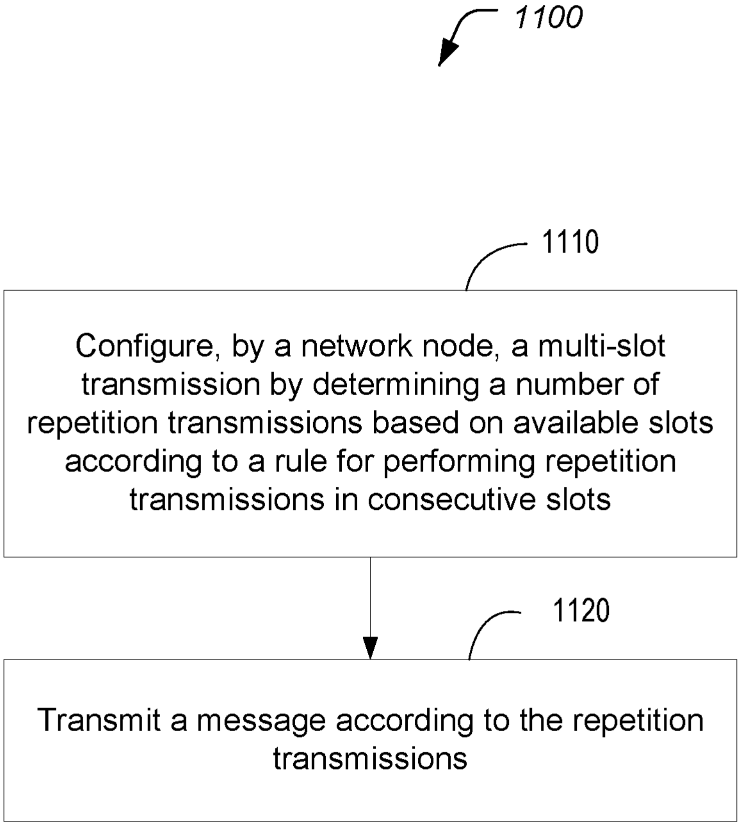
FIG. 11 shows an example of a wireless communication method based on some embodiments of the disclosed technology.

FIG. 11 shows an example of a wireless communication method based on some embodiments of the disclosed technology.

In some embodiments of the disclosed technology, a wireless communication method 1100 includes, at 1110, configuring, by a network node, a multi-slot transmission by determining a number of repetition transmissions based on available slots according to a rule for performing repetition transmissions in consecutive slots, and at 1120, transmitting a message according to the repetition transmissions.

Figure 12:
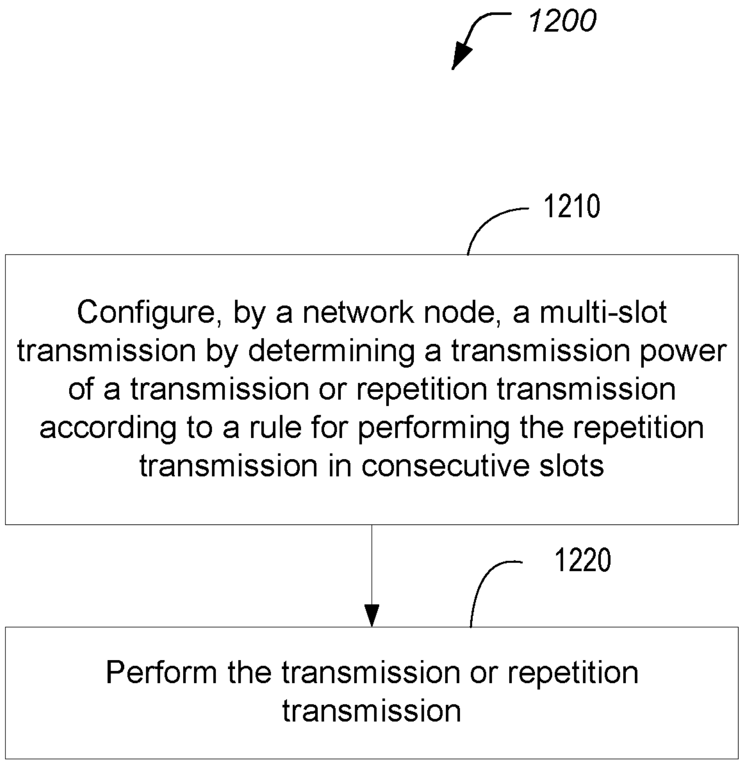
FIG. 12 shows another example of a wireless communication method based on some embodiments of the disclosed technology.

FIG. 12 shows an example of a wireless communication method based on some embodiments of the disclosed technology.

In some embodiments of the disclosed technology, a wireless communication method 1200 includes, at 1210, configuring, by a network node, a multi-slot transmission by determining a transmission power of a transmission or repetition transmission according to a rule for performing the repetition transmission in consecutive slots, and at 1220, performing the transmission or repetition transmission.

Figure 13:
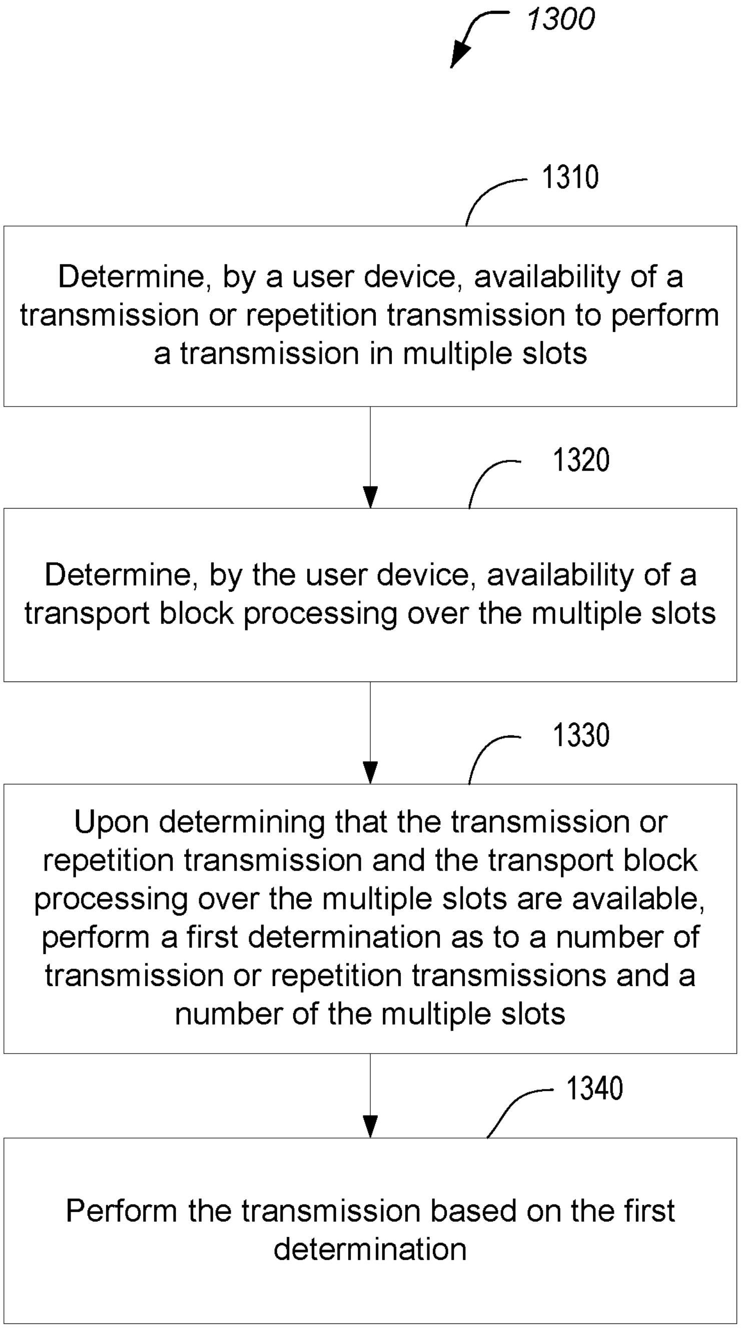
FIG. 13 shows another example of a wireless communication method based on some embodiments of the disclosed technology.

FIG. 13 shows an example of a wireless communication method based on some embodiments of the disclosed technology.

In some embodiments of the disclosed technology, a wireless communication method 1300 includes, at 1310, determining, by a user device, availability of a transmission or repetition transmission to perform a transmission in multiple slots, at 1320, determining, by the user device, availability of a transport block processing over the multiple slots, at 1330, upon determining that the transmission or repetition transmission and the transport block processing over the multiple slots are available, performing a first determination as to a number of transmission or repetition transmissions and a number of the multiple slots, and at 1340, performing the transmission based on the first determination.

Figure 14:
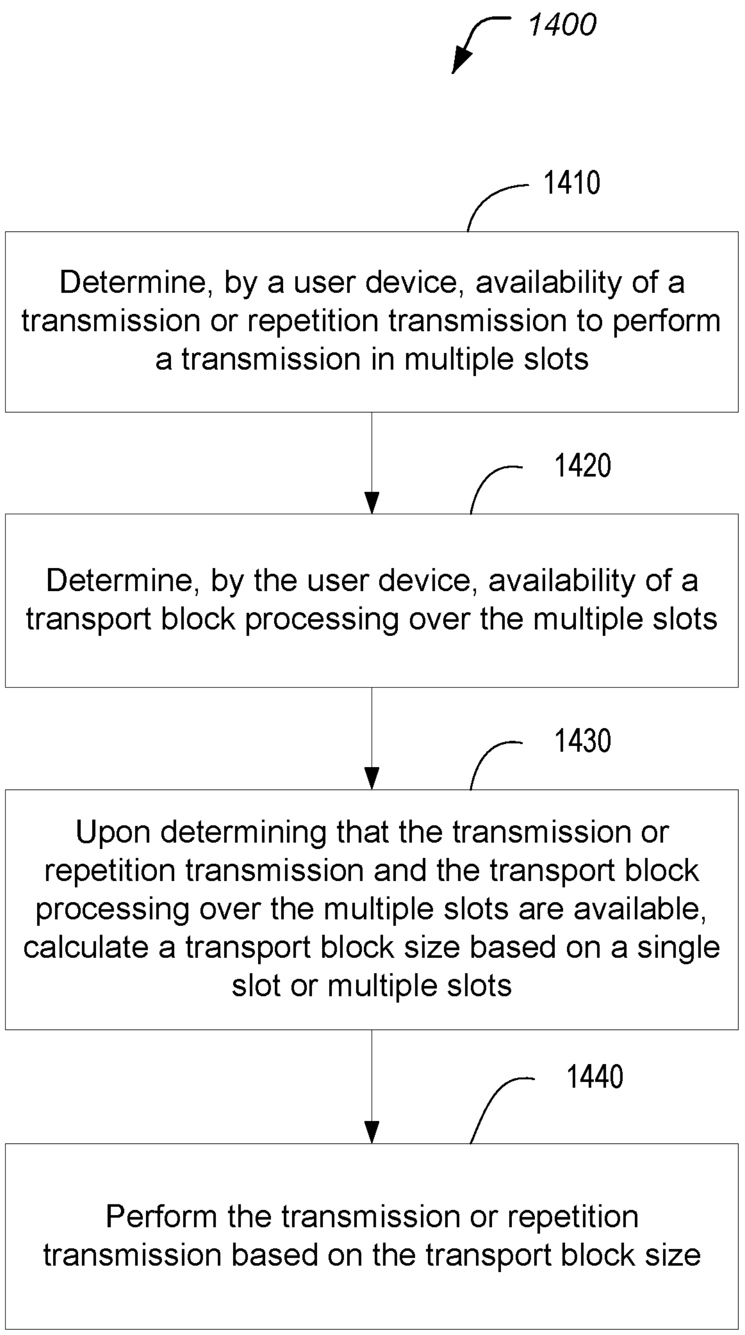
FIG. 14 shows another example of a wireless communication method based on some embodiments of the disclosed technology.

FIG. 14 shows another example of a wireless communication method based on some embodiments of the disclosed technology.

In some embodiments of the disclosed technology, a wireless communication method 1400 includes, at 1410, determining, by a user device, availability of a transmission or repetition transmission to perform a transmission in multiple slots, at 1420, determining, by the user device, availability of a transport block processing over the multiple slots, at 1430, upon determining that the transmission or repetition transmission and the transport block processing over the multiple slots are available, calculating a transport block size based on a single slot or multiple slots, and at 1440, performing the transmission or repetition transmission based on the transport block size.

Figure 15:
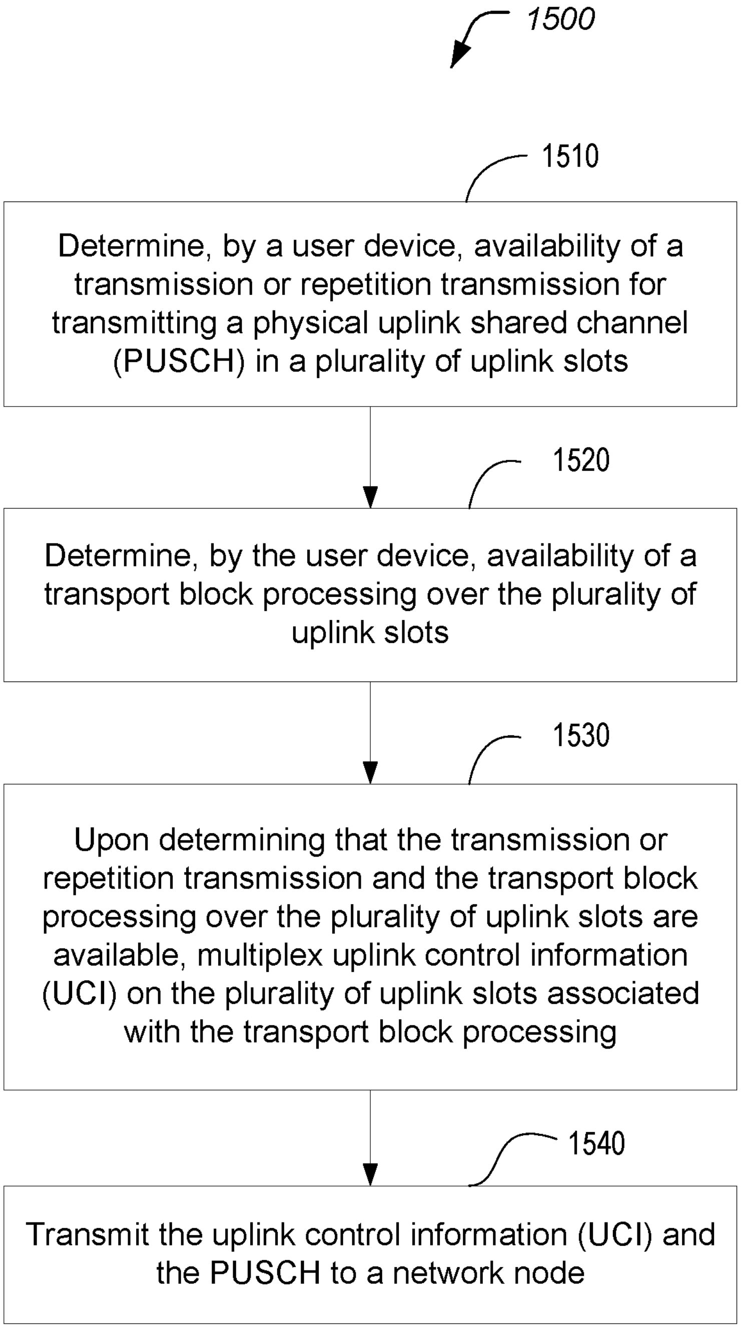
FIG. 15 shows another example of a wireless communication method based on some embodiments of the disclosed technology.

FIG. 15 shows another example of a wireless communication method based on some embodiments of the disclosed technology.

In some embodiments of the disclosed technology, a wireless communication method 1500 includes, at 1510, determining, by a user device, availability of a transmission or repetition transmission for transmitting a physical uplink shared channel (PUSCH) in a plurality of uplink slots, at 1520, determining, by the user device, availability of a transport block processing over the plurality of uplink slots, at 1530, upon determining that the transmission or repetition transmission and the transport block processing over the plurality of uplink slots are available, multiplexing uplink control information (UCI) on the plurality of uplink slots associated with the transport block processing, and at 1540, transmitting the uplink control information (UCI) and the PUSCH to a network node.

Figure 16:
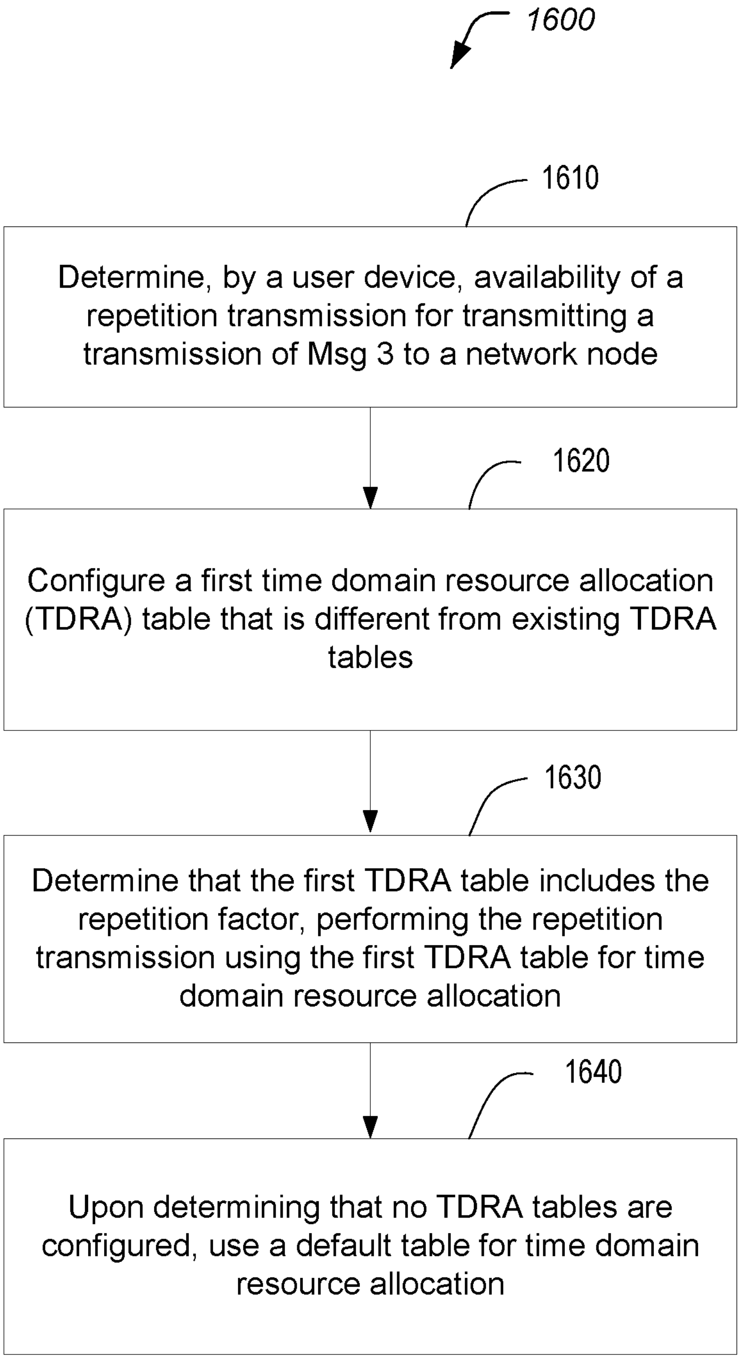
FIG. 16 shows another example of a wireless communication method based on some embodiments of the disclosed technology.

FIG. 16 shows another example of a wireless communication method based on some embodiments of the disclosed technology.

In some embodiments of the disclosed technology, a wireless communication method 1600 includes, at 1610, determining, by a user device, availability of a repetition transmission for transmitting a transmission of Msg 3 to a network node, at 1620, configuring a first time domain resource allocation (TDRA) table that is different from existing TDRA tables, at 1630, determining that the first TDRA table includes the repetition factor, performing the repetition transmission using the first TDRA table for time domain resource allocation, and at 1640, upon determining that no TDRA tables are configured, using a default table for time domain resource allocation.

Figure 17:
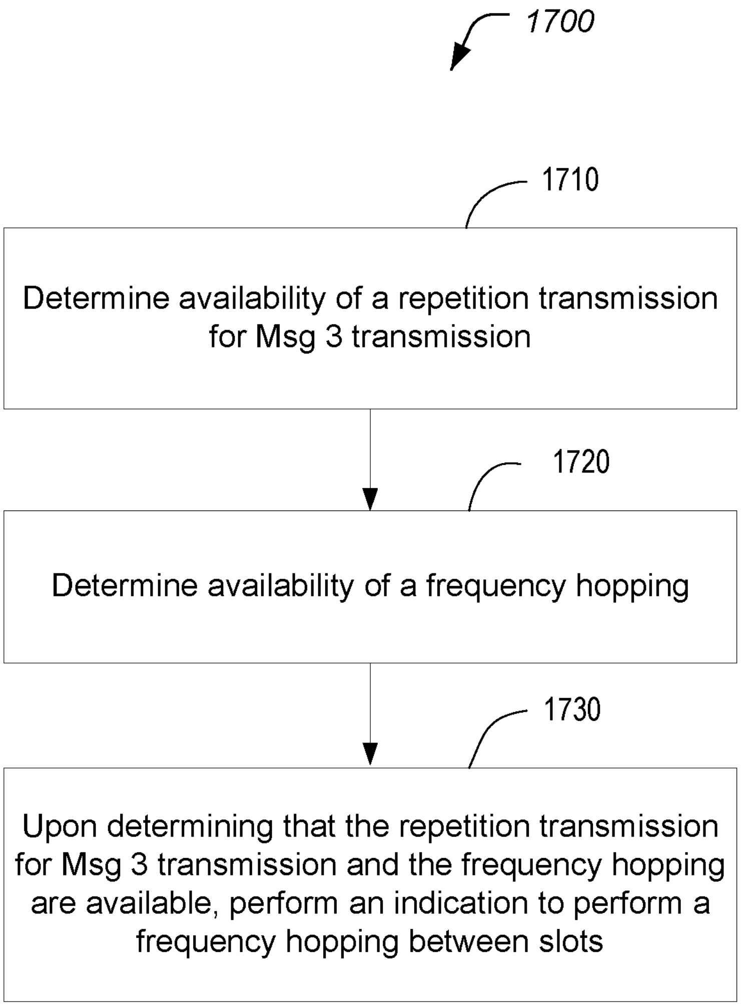
FIG. 17 shows another example of a wireless communication method based on some embodiments of the disclosed technology.

FIG. 17 shows another example of a wireless communication method based on some embodiments of the disclosed technology.

In some embodiments of the disclosed technology, a wireless communication method 1700 includes, at 1710, determining availability of a repetition transmission for Msg 3 transmission, at 1720, determining availability of a frequency hopping, and at 1730, upon determining that the repetition transmission for Msg 3 transmission and the frequency hopping are available, performing an indication to perform a frequency hopping between slots.

Figure 18:
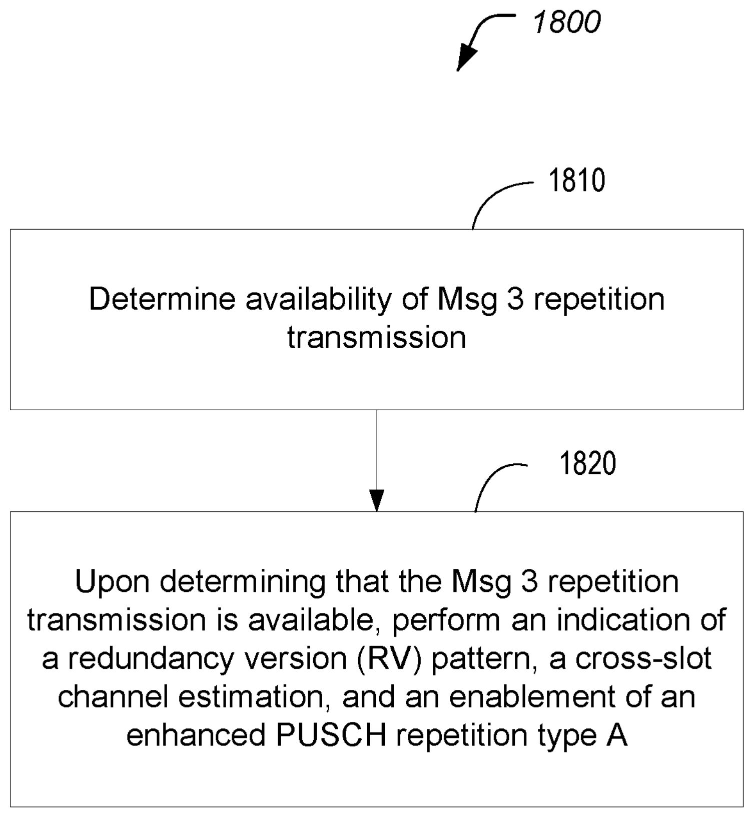
FIG. 18 shows another example of a wireless communication method based on some embodiments of the disclosed technology.

FIG. 18 shows another example of a wireless communication method based on some embodiments of the disclosed technology.

In some embodiments of the disclosed technology, a wireless communication method 1800 includes, at 1810, determining availability of Msg 3 repetition transmission, and at 1820, upon determining that the Msg 3 repetition transmission is available, performing an indication of a redundancy version (RV) pattern, a cross-slot channel estimation, and an enablement of an enhanced PUSCH repetition type A.

Figure 19:
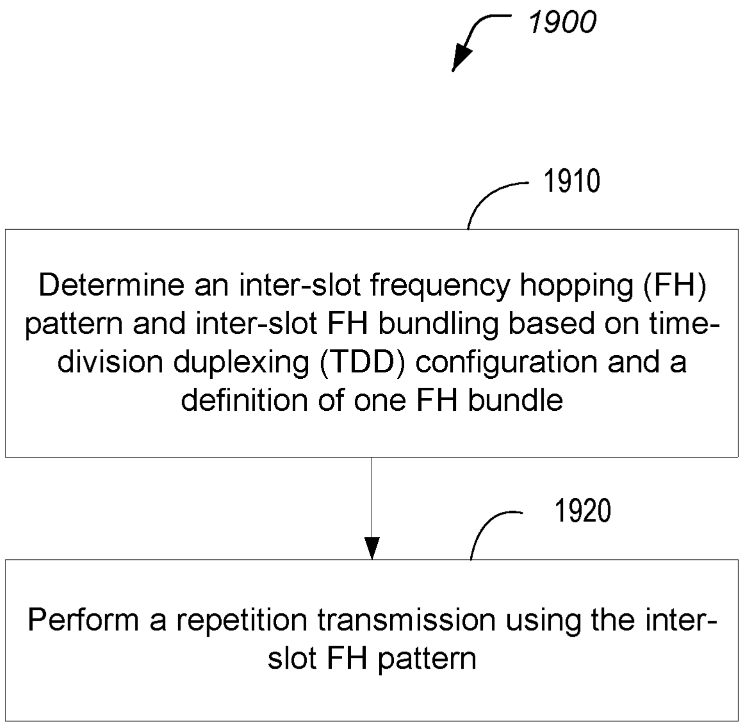
FIG. 19 shows another example of a wireless communication method based on some embodiments of the disclosed technology.

FIG. 19 shows another example of a wireless communication method based on some embodiments of the disclosed technology.

In some embodiments of the disclosed technology, a wireless communication method 1900 includes, at 1910, determining an inter-slot frequency hopping (FH) pattern and inter-slot FH bundling based on time-division duplexing (TDD) configuration and a definition of one FH bundle, and at 1920, performing a repetition transmission using the inter-slot FH pattern.

Figure 20:
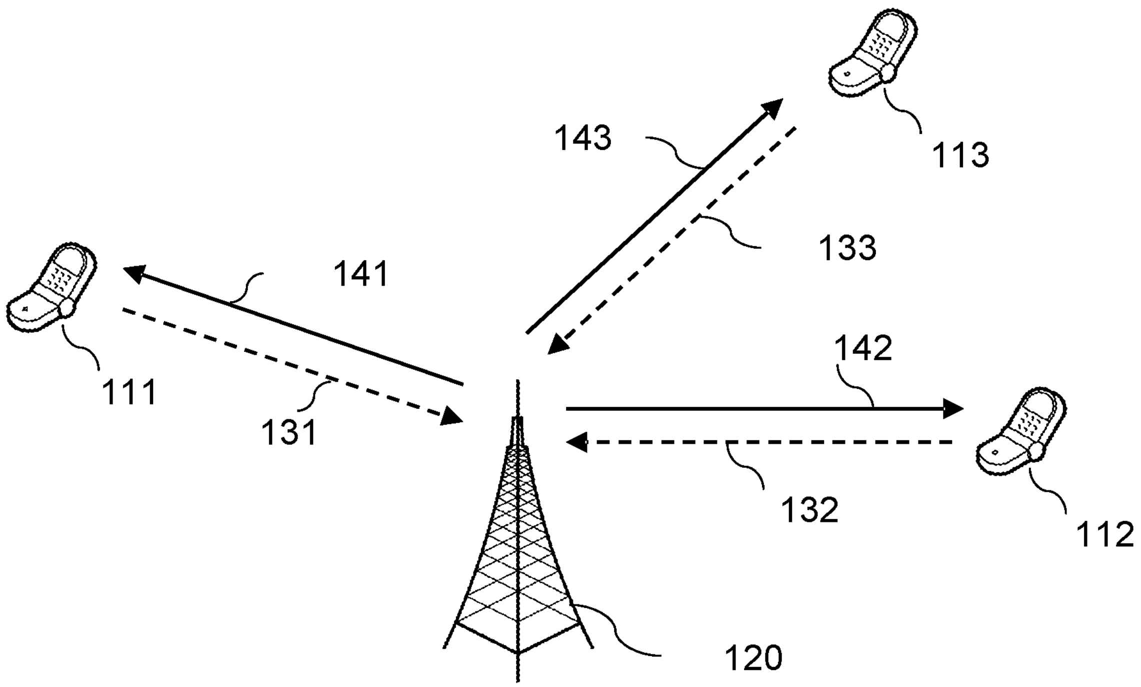
FIG. 20 shows an example of a wireless communication system.

FIG. 20 shows an example of a wireless communication system (e.g., an LTE, 5G New Radio (NR) cellular network) that includes a radio access node 120 and one or more user equipment (UE) 111, 112 and 113. In some embodiments, the downlink transmissions (141, 142, 143) include a control plane message that comprises a processing order for processing the plurality of user plane functions. This may be followed by uplink transmissions (131, 132, 133) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

Figure 21:
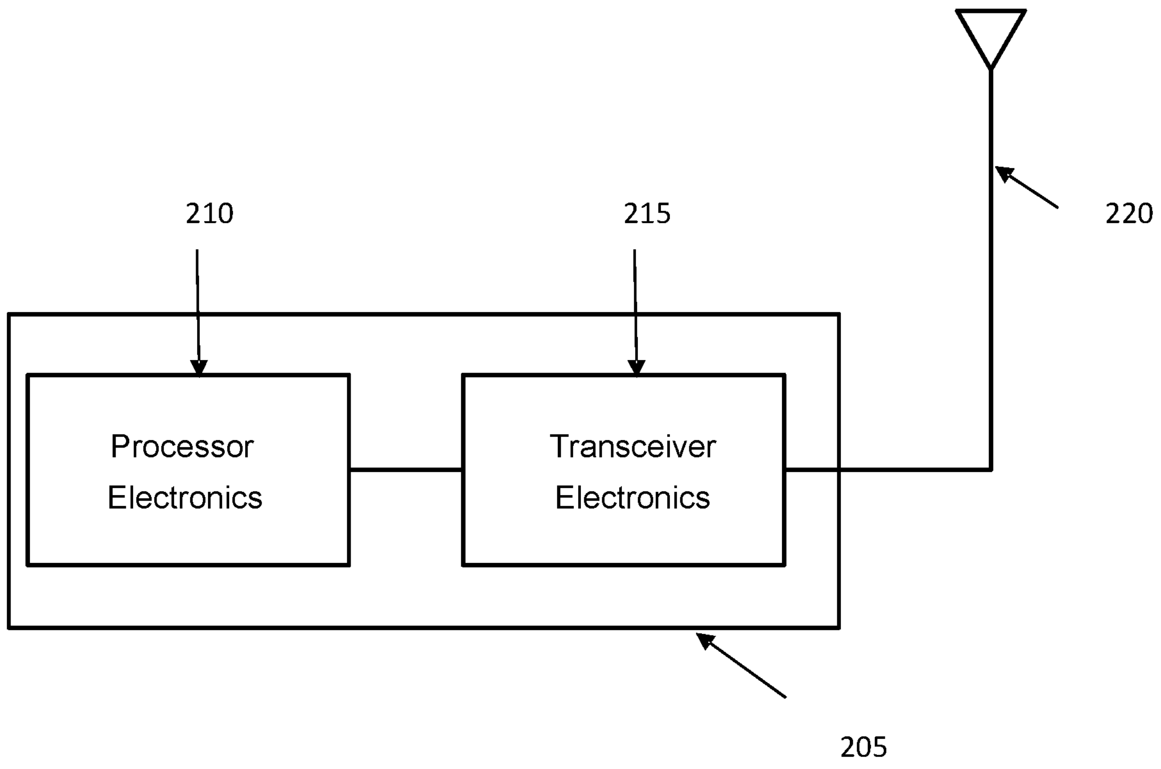
FIG. 21 is a block diagram representation of a portion of a radio station based on one or more embodiments of the disclosed technology can be applied.

FIG. 21 is a block diagram representation of a portion of a radio station based on one or more embodiments of the disclosed technology can be applied. A radio station 205 such as a base station or a wireless device (or UE) can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the radio station 205.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A method for wireless communication, comprising: configuring, by a network node, a multi-slot transmission by determining a number of repetition transmissions based on available slots according to a rule for performing repetition transmissions in consecutive slots; and transmitting a message according to the repetition transmissions.

Clause 2. The method of clause 1, further comprising receiving, by a user device, from the network node, a radio resource control (RRC) signal including an indication that the number of the repetition transmissions is determined based on available slots.

Clause 3. The method of clause 1, further comprising receiving, by a user device, from the network node, a downlink control information (DCI) or a medium access control element (MAC-CE) message including at least one bit to indicate that the number of the repetition transmissions is determined based on available slots.

Clause 4. The method of clause 1, wherein the rule is determined based on a determination of whether the initial access channels transmission enhancement is enabled or whether Msg3 transmission is associated with more than one repetition.

Clause 5. The method of clause 1, further comprising applying a redundancy version (RV) index to the repetition transmissions based on actual repetition transmissions without including the repetition transmissions that are in conflict with a slot format indicator (SFI) or another transmission.

Clause 6. The method of clause 1, further comprising applying a redundancy version (RV) index to the repetition transmissions based on a total number of repetition transmissions including the repetition transmissions that are in conflict with a slot format indicator (SFI) or another transmission.

Clause 7. A method for wireless communication, comprising: configuring, by a network node, a multi-slot transmission by determining a transmission power of a transmission or repetition transmission according to a rule for performing the repetition transmission in consecutive slots; and performing the transmission or repetition transmission.

Clause 8. The method of clause 7, wherein the transmission power of the transmission or repetition transmission is determined based on a single transmission occasion or slot within multiple slots or transmission occasions for joint channel estimation, and wherein the single transmission occasion or slot has a maximum or minimum number of available resource elements.

Clause 9. The method of clause 7, wherein the transmission power of the transmission or repetition transmission is determined based on a single transmission occasion or slot in case that a transport block size (TBS) is determined based on a single transmission occasion or slot.

Clause 10. The method of clause 7, wherein the transmission power of the transmission or repetition transmission is determined based on multiple transmission occasions or slots.

Clause 11. The method of clause 7, wherein the transmission power of the transmission or repetition transmission is determined based on multiple transmission occasions or slots in case that a transport block size (TBS) is determined based on multiple transmission occasions or slots.

Clause 12. A method for wireless communication, comprising: determining, by a user device, availability of a transmission or repetition transmission to perform a transmission in multiple slots; determining, by the user device, availability of a transport block processing over the multiple slots; upon determining that the transmission or repetition transmission and the transport block processing over the multiple slots are available, performing a first determination as to a number of transmission or repetition transmissions and a number of the multiple slots; and performing the transmission based on the first determination.

Clause 13. The method of clause 12, further comprising receiving, by a user device, from a network node, at least one of a radio resource control (RRC) signal or a downlink control information (DCI) or a medium access control element (MAC-CE) message including an indication of the number of the multiple slots.

Clause 14. The method of clause 12, further comprising performing a joint coding of the number of the multiple slots for the transport block processing and a time domain resource allocation (TDRA) table.

Clause 15. The method of clause 12, further comprising determining a redundancy version (RV) pattern to be applied to the repetition transmissions such that an RV index is allocated to each repetition transmission.

Clause 16. The method of clause 15, wherein the repetition transmissions are arranged consecutively in accordance with the redundancy version (RV) pattern over the multiple repetitions such that an RV index is allocated to each repeated transmission.

Clause 17. The method of clause 15, wherein the repetition transmission includes a repetition pattern distributed over multiple inconsecutive slots.

Clause 18. The method of clause 12, wherein a size of FDRA field in DCI is related to the number of slots associated with the TB processing.

Clause 19. The method of clause 12, wherein a repetition transmission includes a single slot physical uplink shared channel (PUSCH) repetition.

Clause 20. The method of clause 12, wherein a transmission or repetition transmissions include multiple slots for the transport block processing.

Clause 21. The method of clause 20, further comprising: determining the transmission or repetition transmissions are in conflict with a slot format indicator (SFI) or another transmission; and performing the uplink transmission by omitting at least part of the repetition transmissions.

Clause 22. A method for wireless communication, comprising: determining, by a user device, availability of a transmission or repetition transmission to perform a transmission in multiple slots; determining, by the user device, availability of a transport block processing over the multiple slots; upon determining that the transmission or repetition transmission and the transport block processing over the multiple slots are available, calculating a transport block size based on a single slot or multiple slots; and performing the transmission or repetition transmission based on the transport block size.

Clause 23. The method of clause 22, wherein the transport block size is calculated based on a single slot associated with the multiple slots for transport block processing.

Clause 24. The method of clause 22, wherein the transport block size is calculated based on the multiple slots for transport block processing.

Clause 25. The method of clause 24, wherein the transport block size is not larger than a threshold value.

Clause 26. The method of clause 24, wherein the transport block size is limited by a data rate.

Clause 27. The method of clause 22, further comprising determining a number of symbols assigned to the transmission or repetition transmission and a number of bits in the transport block.

Clause 28. The method of clause 27, wherein the number of symbols assigned to the transmission or repetition transmission is determined based on a number of symbols in one slot within multiple slots for the transport block processing, and the number of bits in the transport block is determined based on one slot within the multiple slots for the transport block processing.

Clause 29. The method of clause 27, wherein the number of symbols assigned to the transmission or repetition transmission is determined based on a number of symbols in multiple slots for the transport block processing, and the number of bits in the transport block is determined based on the multiple slots for the transport block processing.

Clause 30. The method of clause 27, wherein the number of symbols assigned to the transmission or repetition transmission is determined based on a number of symbols in one slot within multiple slots for the transport block processing, and the number of bits in the transport block is determined based the multiple slots for the transport block processing.

Clause 31. The method of clause 27, wherein the number of symbols assigned to the transmission or repetition transmission is determined based on a number of symbols in multiple slots for the transport block processing, and the number of bits in the transport block is determined based on one slot within the multiple slots for the transport block processing.

Clause 32. A method for wireless communication, comprising: determining, by a user device, availability of a transmission or repetition transmission for transmitting a physical uplink shared channel (PUSCH) in a plurality of uplink slots; determining, by the user device, availability of a transport block processing over the plurality of uplink slots; upon determining that the transmission or repetition transmission and the transport block processing over the plurality of uplink slots are available, multiplexing uplink control information (UCI) on the plurality of uplink slots associated with the transport block processing; and transmitting the uplink control information (UCI) and the PUSCH to a network node.

Clause 33. The method of clause 32, wherein the UCI is multiplexed on a slot that is overlapped with a physical uplink control channel (PUCCH), and wherein the slot includes a dedicated demodulation reference signal (DMRS) symbol.

Clause 34. The method of clause 32, wherein the UCI is multiplexed on a slot that is not overlapped with a physical uplink control channel (PUCCH) and nearest to a start or an end symbol of the PUCCH in a time domain.

Clause 35. The method of clause 32, wherein the UCI is multiplexed on multiple slots for the transport block processing that are overlapped or not with the PUSCH transmission.

Clause 36. The method of clause 32, wherein a first slot of the multiple slots includes a dedicated demodulation reference signal (DMRS) symbol.

Clause 37. The method of any of clauses 32-36, wherein a first symbol that is used for uplink control information (UCI) multiplexing satisfies a corresponding timeline condition.

Clause 38. A method for wireless communication, comprising: determining, by a user device, availability of a repetition transmission for transmitting a transmission of Msg 3 to a network node; configuring a first time domain resource allocation (TDRA) table that is different from existing TDRA tables; determining that the first TDRA table includes the repetition factor, performing the repetition transmission using the first TDRA table for time domain resource allocation; and upon determining that no TDRA tables are configured, using a default table for time domain resource allocation.

Clause 39. The method of clause 38, further comprising adding one column in the first TDRA table for the repetition factor.

Clause 40. The method of clause 39, wherein a bit field in a downlink control information (DCI) for the user device, scrambled by a temporary cell radio network temporary identifier (TC-RNTI), indicates a row of the first TDRA table including the repetition factor.

Clause 41. The method of clause 38, wherein the first TDRA table is configured in pusch-ConfigCommon or pusch-Config or both pusch-ConfigCommon and pusch-Config.

Clause 42. The method of clause 41, further comprising, in case the first TDRA table is configured, performing a selection of TDRA tables for Msg3 re-transmission or initial transmission.

Clause 43. The method of clause 38, wherein the first TDRA table is configured, performing a selection of TDRA tables for Msg3 initial transmission by RAR UL grant or fallback RAR UL grant.

Clause 44. The method of clause 38, further comprising, in case the TDRA table is not configured, indicating the repetition factor by including PUSCH-TimeDomainResourceAllocationList-r17 in pusch-ConfigCommon.

Clause 45. The method of clause 38, further comprising, in case the TDRA table is not configured, indicating the repetition factor by adding the repetition factor in the default table.

Clause 46. The method of clause 38, further comprising, in case the TDRA table is not configured, indicating the repetition factor by using one or more bits in a random access response (RAR) uplink (UL) grant.

Clause 47. A method for wireless communication, comprising: determining availability of a repetition transmission for Msg 3 transmission; determining availability of a frequency hopping; and upon determining that the repetition transmission for Msg 3 transmission and the frequency hopping are available, performing an indication to perform a frequency hopping between slots.

Clause 48. The method of clause 47, wherein the indication includes RRC parameter associated with frequency hopping in SIB message.

Clause 49. The method of clause 47, wherein the indication includes a one-bit frequency hopping flag in RAR grant or DCI format scrambled by TC-RNTI.

Clause 50. A method for wireless communication, comprising: determining availability of Msg 3 repetition transmission; and upon determining that the Msg 3 repetition transmission is available, performing an indication of a redundancy version (RV) pattern, a cross-slot channel estimation, and an enablement of an enhanced PUSCH repetition type A.

Clause 51. The method of clause 50, wherein the indication of the RV pattern includes a fixed RV cycling pattern.

Clause 52. The method of clause 50, further comprising performing an indication of an RV index for a first repetition for Msg3 initial transmission by using one or more bits in RAR UL grant or fallback RAR UL grant or by using one or more bits in DCI format with cyclic redundancy check (CRC) scrambled by random access radio network temporary identifier (RA-RNTI).

Clause 53. The method of clause 50, wherein the cross-slot channel estimation is indicated by using one or more bits in RAR UL grant or fallback RAR UL grant to indicate a signaling for the cross-slot channel estimation for Msg3 initial transmission.

Clause 54. The method of clause 50, wherein the enablement of the enhanced PUSCH repetition type A is indicated by using one or more bits in RAR UL grant or fallback RAR UL grant to indicate a signaling for Msg3 initial transmission.

Clause 55. The method of clause 38, further comprising starting a timer after completion of all transmission repetitions of Msg3.

Clause 56. The method of clause 38, further comprising restarting a timer after completion of each repetition of Msg3.

Clause 57. The method of clause 38, further comprising restarting a timer after completion of a group of consecutive repetitions.

Clause 58. The method of any of clauses 55-57, wherein the timer includes ra-ContentionResolutionTimer.

Clause 59. A method for wireless communication, comprising: determining an inter-slot frequency hopping (FH) pattern and inter-slot FH bundling based on time-division duplexing (TDD) configuration and a definition of one FH bundle; and performing a repetition transmission using the inter-slot FH pattern.

Clause 60. The method of clause 59, wherein the inter-slot FH bundling is based on consecutive slots.

Clause 61. The method of clause 59, wherein the inter-slot FH bundling is based on available slots.

Clause 62. The method of clause 59, wherein the inter-slot FH bundling is based on each set of consecutive available slots.

Clause 63. An apparatus for wireless communication, comprising a memory and a processor, wherein the processor reads code from the memory and implements a method recited in any of clauses 1 to 62.

Clause 64. A computer readable program storage medium having code stored thereon, the code, when executed by a processor, causing the processor to implement a method recited in any of clauses 1 to 62.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:

determining, by a user device, availability of a transmission or repetition transmission for transmitting a physical uplink shared channel (PUSCH) in a plurality of uplink slots;

determining, by the user device, availability of a transport block processing over the plurality of uplink slots;

upon determining that the transmission or repetition transmission and the transport block processing over the plurality of uplink slots are available, multiplexing uplink control information (UCI) on a slot among the plurality of uplink slots associated with the transport block processing, wherein the slot includes a dedicated demodulation reference signal (DMRS) symbol, and wherein a first symbol used for multiplexing the UCI satisfies a corresponding timeline condition; and transmitting the UCI and the PUSCH to a network node.

2. The method of claim 1, wherein the slot is overlapped with a physical uplink control channel (PUCCH).

3. The method of claim 1, wherein the slot is not overlapped with a physical uplink control channel (PUCCH) and is nearest to a start symbol or an end symbol of the PUCCH in a time domain.

4. The method of claim 1, wherein the UCI is multiplexed on multiple slots associated with the transport block processing.

5. The method of claim 4, wherein a first slot of the multiple slots includes the dedicated demodulation reference signal (DMRS) symbol.

6. The method of claim 4, wherein the uplink control information (UCI) is multiplexed on the multiple slots from back to front in a time domain, and a last symbol within the multiple slots used for multiplexing the UCI satisfies the corresponding timeline condition.

7. An apparatus for wireless communication, comprising a memory and processor electronics, wherein the processor electronics is configured to read code from the memory and cause the apparatus to implement a method, comprising:

determining availability of a transmission or repetition transmission for transmitting a physical uplink shared channel (PUSCH) in a plurality of uplink slots;

determining availability of a transport block processing over the plurality of uplink slots;

upon determining that the transmission or repetition transmission and the transport block processing over the plurality of uplink slots are available, multiplexing uplink control information (UCI) on a slot among the plurality of uplink slots associated with the transport block processing, wherein the slot includes a dedicated demodulation reference signal (DMRS) symbol, and wherein a first symbol used for multiplexing the UCI satisfies a corresponding timeline condition; and transmitting the uplink control information (UCI) and the PUSCH to a network node.

8. The apparatus of claim 7, wherein the slot is overlapped with a physical uplink control channel (PUCCH).

9. The apparatus of claim 7, wherein the slot is not overlapped with a physical uplink control channel (PUCCH) and is nearest to a start symbol or an end symbol of the PUCCH in a time domain.

10. The apparatus of claim 7, wherein the UCI is multiplexed on multiple slots associated with the transport block processing.

11. The apparatus of claim 10, wherein a first slot of the multiple slots includes the dedicated demodulation reference signal (DMRS) symbol.

12. The apparatus of claim 10, wherein the uplink control information (UCI) is multiplexed on the multiple slots from back to front in a time domain, and a last symbol within the multiple slots used for multiplexing the UCI satisfies the corresponding timeline condition.

* * * * *